US012621874B2

(12) United States Patent
Park

(10) Patent No.: US 12,621,874 B2
(45) Date of Patent: May 5, 2026

(54) RANDOM ACCESS METHOD AND DEVICE FOR REDUCED CAPABILITY TERMINAL IN WIRELESS COMMUNICATION SYSTEM

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 535 days.

(21) Appl. No.: 17/929,459

(22) Filed: Sep. 2, 2022

(65) Prior Publication Data

US 2023/0007702 A1      Jan. 5, 2023

Related U.S. Application Data

(63) Continuation of application No. PCT/KR2021/002672, filed on Mar. 4, 2021.

(30) Foreign Application Priority Data

Mar. 5, 2020      (KR) ........................ 10-2020-0027883

(51) Int. Cl.
        *H04W 74/0833*        (2024.01)
        *H04W 74/00*        (2009.01)
        *H04W 74/0836*        (2024.01)
(52) U.S. Cl.
        CPC ..... *H04W 74/0841* (2013.01); *H04W 74/006* (2013.01); *H04W 74/0833* (2013.01); *H04W 74/0836* (2024.01)

(58) Field of Classification Search
        CPC ......... H04W 74/0833; H04W 74/0836; H04W 74/0838; H04W 74/0841; H04W 74/085;
                (Continued)

(56) References Cited

U.S. PATENT DOCUMENTS

| | | | |
|---|---|---|---|
| 2014/0010178 A1 | 1/2014 | Yu et al. | |
| 2022/0279595 A1* | 9/2022 | Jang | ...................... H04W 48/18 |
| 2023/0036057 A1* | 2/2023 | Lei | ........................... H04W 8/22 |

FOREIGN PATENT DOCUMENTS

| | | |
|---|---|---|
| CN | 105723792 A | 6/2016 |
| CN | 108260108 A | 7/2018 |

(Continued)

OTHER PUBLICATIONS

Extended European Search Report from European Patent Office for Applicant No. 21763555.6 dated Jun. 18, 2024.

(Continued)

*Primary Examiner* — Peter Chen

(57)      ABSTRACT

Disclosed is a random access method and apparatus for a reduced capability user equipment in a wireless communication system. A method of performing random access by a UE in a wireless communication system according to an embodiment of the disclosure may include an operation of receiving random access-related configuration information from a base station; an operation of determining at least one of a RACH occasion (RO) group related to random access preamble transmission, one or more ROs, and a random access preamble group based on at least one of the random access-related configuration information, a UE type, and a repetition level; and an operation of transmitting one or more random access preambles in each of the one or more ROs.

22 Claims, 14 Drawing Sheets

(58) Field of Classification Search
CPC ........... H04W 74/0858; H04W 74/002; H04W 74/004; H04W 74/006; H04W 76/27; H04W 72/23; H04W 72/231; H04W 72/232; H04W 48/12
See application file for complete search history.

(56) References Cited

FOREIGN PATENT DOCUMENTS

| | | | |
|---|---|---|---|
| CN | 109152083 | A | 1/2019 |
| EP | 1969738 | B1 | 3/2014 |
| EP | 3793310 | A1 | 3/2021 |
| KR | 10-2007-0080541 | A | 8/2007 |
| KR | 10-2013-0084956 | A | 7/2013 |
| KR | 10-2018-0126862 | A | 11/2018 |
| KR | 10-1995798 | B1 | 7/2019 |
| WO | 2019-184956 | A1 | 10/2019 |
| WO | 2019/216341 | A1 | 11/2019 |
| WO | 2019-216702 | A1 | 11/2019 |
| WO | 2020/198671 | A1 | 10/2020 |

OTHER PUBLICATIONS

3GPP TSG RAN WG1 #89 Meeting Hangzhou, P.R. China, May 15-19, 2017; R1-1707049; Title: 4-step random access procedure; Agenda Item: 7.1.1.4.2.

Examination report from Intellectual Property India for Applicant No. 202217055627 dated Feb. 1, 2024.
International Search Report for International Patent Application No. PCT/KR2021/002672, dated Jun. 18, 2021.
Written Opinion for International Patent Application No. PCT/KR2021/002672, dated Jun. 18, 2021.
"3rd Generation Partnership Project; Technical Specification Group Radio Access Network; NR; NR and NG-RAN Overall Description; Stage 2 (Release 16)," Dec. 2019, pp. 1-101, 3GPP TS 38.300 V16.0.0, 3GPP Organizational Partners.
"3rd Generation Partnership Project; Technical Specification Group Radio Access Network; NR; Medium Access Control (MAC) protocol specification (Release 15)," Dec. 2019, pp. 1-78, 3GPP TS 38.321 V15.8.0, 3GPP Organizational Partners.
"3rd Generation Partnership Project; Technical Specification Group Radio Access Network; NR; Radio Resource Control (RRC) protocol specification (Release 15)," Dec. 2019, pp. 1-450, 3GPP TS 38.331 V15.8.0, 3GPP Organizational Partners.
"3rd Generation Partnership Project; Technical Specification Group Radio Access Network; NR; Physical layer procedures for control (Release 15)," Dec. 2019, pp. 1-109, 3GPP TS 38.213 V15.8.0, 3GPP Organizational Partners.
3GPP TSG-RAN WG1 Nb-Iot Ad-Hoc Meeting R1-161836 Sophia Antipolis, France, Mar. 22-24, 2016. "NB—IoT—Remaining issues for random access procedure". Ericsson.

* cited by examiner

RANDOM ACCESS METHOD AND DEVICE FOR REDUCED CAPABILITY TERMINAL IN WIRELESS COMMUNICATION SYSTEM

CROSS-REFERENCE TO RELATED APPLICATIONS

This application is a continuation of International patent application No. PCT/KR2021/002672, filed on Mar. 4, 2021, which claims priority from and the benefit of Korean Patent Application No. 10-2020-0027883, filed on Mar. 5, 2020, each of which is hereby incorporated by reference in its entirety.

BACKGROUND

1. Field

The disclosure relates to random access in a wireless communication system, and particularly, to a random access method and apparatus for a user equipment (UE) with reduced capability, compared to a legacy UE.

2. Discussion of the Background

The $3^{rd}$ Generation Partnership Project (3GPP) New Radio (NR) system may support various numerologies in association with the standard of a time-frequency resource unit in consideration of various scenarios, service require- ments, potential system compatibility, and the like, in order to satisfy requirements for $5^{th}$ (5G) communication. Also, to overcome a poor channel environment, such as high path- loss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra Machine Type Communications (uMTC), and Ultra Reliable and Low Latency Communications (URLLC). Here, mMTC, URLLC, and TSC may be associated with the utilization of an advanced Internet of Things (IoT) in consideration of the vertical industrial world. Such applications may be sup- ported in the same network.

Discussions have been conducted in order to support a new type of device in the 3GPP NR system. For example, the new type of device may include industrial wireless sensors, video surveillance, and wearable devices. Services for such new type of device have a higher requirement than a low power wide area network (LPWAN) such as the legacy LTE-MTC (LTE M) or narrow band-IoT (NB-IoT), but have a lower requirement than eMBB or URLLC. Given the above-described feature, such new types of device may be referred to as a reduced capability (RC) device. A method of supporting an RC UE in the 3GPP NR system has been discussed, and particularly, a specific method for random access by an RC UE has not been provided.

SUMMARY

An aspect of the disclosure is to provide a new random access method and apparatus for an RC user equipment (UE) in a wireless communication system.

Another aspect of the disclosure is to provide a method and apparatus for identifying an RC UE in a network during initial access by a UE.

Another aspect of the disclosure is to provide a method and apparatus for identifying an RC UE in a network during a random access preamble transmission process performed by a UE.

The technical subject matters of the disclosure are not limited to the above-mentioned technical subject matters, and other technical subject matters which are not mentioned may be understood by those skilled in the art based on the following description.

A method of performing random access by a user equip- ment (UE) in a wireless communication system according to an aspect of the disclosure may include an operation of receiving random access-related configuration information from a base station, an operation of determining at least one of a RACH occasion (RO) group related to random access preamble transmission, one or more ROs, and a random access preamble group based on at least one of the random access-related configuration information, the type of UE, and a repetition level, and an operation of transmitting one or more random access preambles in each of the one or more ROs.

Features briefly described above in relation to the present disclosure are merely example aspects of the following detailed description and do not limit the scope of the present disclosure.

According to the disclosure, a new random access method and apparatus for an RC user equipment (UE) in a wireless communication system can be provided.

According to the disclosure, a method and apparatus for identifying an RC UE in a network during initial access by a UE can be provided.

According to the disclosure, a method and apparatus for identifying an RC UE in a network during a random access preamble transmission process performed by a UE can be provided.

Effects achievable from the present disclosure are not limited to the aforementioned effects and still other effects not described herein may be clearly understood by one of ordinary skill in the art to which the present disclosure pertains from the following description.

DETAILED DESCRIPTION

Figure 1:
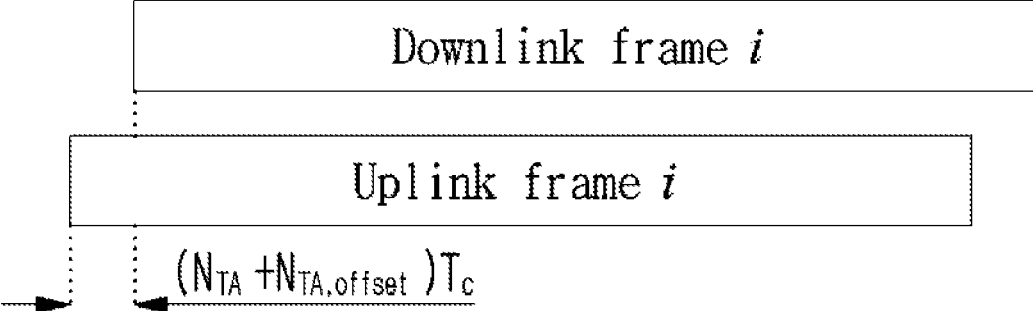
FIG. 1 is a diagram illustrating an NR frame structure to which the disclosure is applicable.

Various examples of the disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

In describing the examples, detailed descriptions of known configurations or functions will be omitted when it is determined that the detailed descriptions cloud the subject matter of the disclosure. In the drawings, a portion that is irrelevant to the detailed description is omitted and the like drawing reference numerals are understood to refer to the like portions.

Herein, it will be understood that when an element is referred to as being "connected to", "coupled to", or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Herein, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another element. Likewise, a second element in an example may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the disclosure.

Herein, elements described in various examples may not be necessarily essential and may be partially selectable. Therefore, an example including a partial set of elements described in an example is also included in the scope of the disclosure. Also, an example that additionally includes another element to elements described in various examples is also included in the scope of the disclosure.

The terms used in this disclosure are intended to describe a particular example and are not intended to limit the scope of claims. As used in the description of the examples and in the accompanying claims, the singular form is intended to include a plurality of forms as well, unless expressly indicated differently in context. In addition, the term "and/or" as used herein may refer to one of the related enumeration items, or means to refer to and include at least two or more of any and all possible combinations thereof.

The description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, an eNodeB (eNB), an ng-eNB, a gNodeB (gNB), an access point (AP), and the like Also, the term 'terminal' may be interchangeably used with other terms, for example, user equipment (UE), a mobile station (MS), a mobile subscriber station (MSS), a subscriber station (SS), and a non-AP station (non-AP STA), and the like.

In the disclosure, transmitting or receiving a channel includes a meaning of transmitting or receiving information or a signal through the corresponding channel. For example, transmitting a control channel indicates transmitting control information or a signal through the control channel Likewise, transmitting a data channel indicates transmitting data information or a signal through the data channel.

The definitions of abbreviations used herein are as below.
B SR: Buffer Status Report
CSI-RS: Channel State Information-Reference Signal
MAC: Medium Access Control
PDCCH: Physical Downlink Control Channel
PDSCH: Physical Downlink Shared Channel
PRACH: Physical Random Access Channel
RA: Random Access
RACH: Random Access Channel
RC: Reduced Capability or Reduced Complexity
RO: RACH Occasion or PRACH Occasion
RRC: Radio Resource Control
RSRP: Reference Signal Received Power
SCS: Sub-Carrier Spacing
SIB: System Information Block
SSB: Synchronization Signal Block Here, 5G mobile communication technology may be defined by including the existing Long Term Evolution-Advanced (LTE-A) system as well as the aforementioned NR system. That is, the 5G system may include the case in which LTE-affiliated radio access technology and NR radio access technology are applied together, in addition to the case in which the NR radio access technology is solely applied. In addition, 5G sidelink technology may include all sidelink technologies that solely applies NR or applies LTE-affiliated technology and NR together.

Hereinafter, the physical resource structure of an NR system will be described.

FIG. 1 is a diagram illustrating an NR frame structure to which the disclosure is applicable.

FIG. 1 is a diagram illustrating an NR frame structure to which the disclosure is applicable.

In NR, a basic unit of a time domain may be $T_c=1/(\Delta f_{max}\cdot N_f)$. Here, $\Delta f_{max}=480\ 10^3$ and $N_f=4096$. In LTE, the basic unit of the time domain may be $T_s=1/(\Delta f_{ref}\cdot N_{f,ref})$. Here, $\Delta f_{ref}=15\cdot10^3$ and $N_{f,ref}=2048$. A constant value associated with a multiple relationship between an NR basic time unit and an LTE basic time unit may be defined as $\kappa=T_s/T_c=64$.

Referring to FIG. 1, a time structure of a frame for a downlink/uplink (DL/UL) transmission may include $T^f = (\Delta f_{max} N_f/100) \cdot T_s = 10$ ms. Here, a single frame may include 10 subframes corresponding to $T_{sf} = (\Delta f_{max} N_f/100) \cdot T_s = 1$ ms. A number of consecutive orthogonal frequency division multiplexing (OFDM) symbols per subframe may be $$N_{symb}^{subframe,\mu} = N_{symb}^{slot} N_{slot}^{subframe,\mu}.$$

Also, each frame may be divided into two half frames and the half frames may include 0-4 subframes and 5-9 subframes. Here, half frame 1 may include 0-4 subframes and half frame 2 may include 5-9 subframes.

Referring to FIG. 1, $N_{TA}$ represents the timing advance (TA) between the downlink (DL) and the uplink (UL). Here, a transmission timing of uplink transmission frame i is determined based on a downlink reception timing at a UE according to the following Equation 1.

$$T_{TA} = (N_{TA} + N_{TA,offset})T_c$$

In Equation 1, $N_{TA,offset}$ denotes a TA offset value occurring due to a duplex mode difference and the like. Basically, in a frequency division duplex (FDD), $N_{TA,Offset}=0$. In a time division duplex (TDD), $N_{TA,offset}$ may be defined as a fixed value by considering a margin for a DL-UL switching time.

Figure 2:
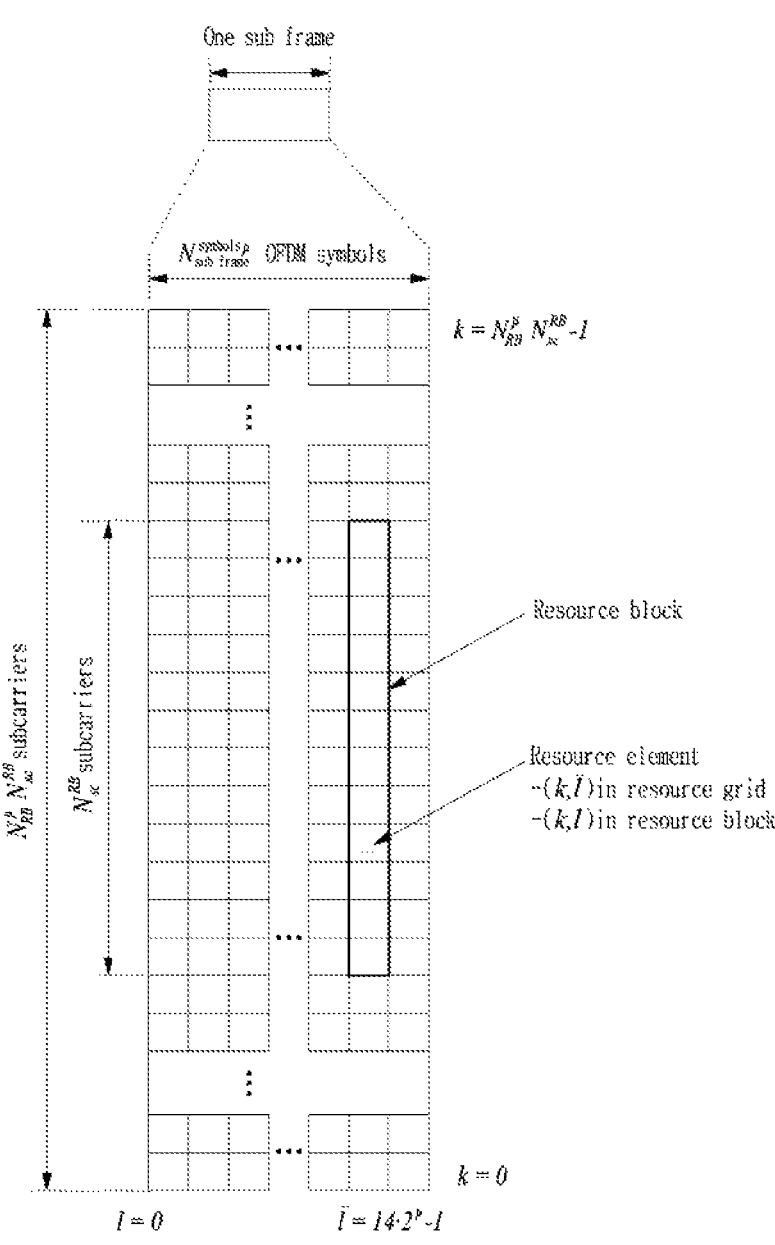
FIG. 2 is a diagram illustrating an NR resource structure to which the disclosure is applicable.

FIG. 2 illustrates an example of a resource grid and a resource block.

Referring to FIG. 2, a resource element within a resource grid may be indexed based on each subcarrier spacing. Here, a single resource grid may be generated for each antenna port and for each subcarrier spacing. Uplink/downlink transmission and reception may be performed based on a corresponding resource grid.

A single resource block may be configured on a frequency domain using 12 resource elements and may configure an index $n_{pRB}$ for a single resource block every 12 resource elements. An index of the resource block may be used in a specific frequency band or system bandwidth. The index of the resource block may be defined as shown in following Equation 2. Herein, $$N_{sc}^{RB}$$

means the number of subcarriers per RB, and k means the subcarrier index.

$$n_{PRB} = \left\lfloor \frac{k}{N_{sc}^{RB}} \right\rfloor \qquad \text{[Equation 2]}$$

Numerologies may be variously configured to meet various services and requirements of the NR system. Table 1 below shows an example of a numerology supported by the NR system.

TABLE 1

| μ | $\Delta = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Referring to the following Table 1, the numerologies may be defined based on an SCS, a cyclic prefix (CP) length, and a number of Orthogonal Frequency Division Multiplexing (OFDM) symbols per slot, which are used in an OFDM system. The aforementioned values may be provided to a UE through upper layer parameters, DL-BWP-mu and DL-BWP-cp (DL) and UL-BWP-mu and UL-BWP-cp (UL). Also, for example, referring to the following Table 1, if μ=2 and SCS=60 kHz, a normal CP and an extended CP may be applied. In other numerology indexes, only the normal CP may be applied.

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having a number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, a number of symbols used to define the non-slot may include at least two OFDM symbols. Here, the range of the number of OFDM symbols included in the non-slot may be configured with a length of a mini slot up to (normal slot length)-1. Here, although the number of OFDM symbols may be limited to 2, 4, or 7 as a non-slot standard, it is provided as an example only.

In addition, for example, a subcarrier spacing corresponding to the case in which μ is 1 and 2 is used in in an unlicensed band of 6 GHz or less, and a subcarrier spacing corresponding to the case in which μ is 3 and 4 is used in an unlicensed band above 6 GHz Here, for example, in the case that μ is 4, it may be used only for a synchronization signal block (SSB).

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 2-continued

| $\mu$ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |

Table 2 shows, in the case of normal CP, a number of OFDM symbols per slot $$\left(N_{slot}^{symb,\mu}\right),$$

a number of slots per frame $$\left(N_{slot}^{frame,\mu}\right),$$

and a number of slots per subframe $$\left(N_{slot}^{subframe,\mu}\right)$$

for each SCS setting parameter μ. In Table 2, the values are based on the normal slot having 14 OFDM symbols.

TABLE 3

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

Table 3 shows, in the case the extended CP may be applied (μ=2 and SCS=60 kHz), a number of slots per frame and a number of slots per subframe based on the normal slot of which the number of OFDM symbols per slot $$\left(N_{slot}^{symb,\mu}\right)$$

is 12.

Hereinafter, an RC NR to which the disclosure is applicable will be described.

In 3GPP, it is identified that IMT-2020 requirements is capable of being authenticated via NB-IoT or LTE-M for the purpose of mMTC. To support URLLC, all URLLC functions have been introduced to Rel-15 LTE/NR. The NR URLLC is still continuously being evolved via Rel-16 eURLLC and industrial IoT (IIoT) work items. In addition, in Rel-16, 5G integration has been conducted for applying time-sensitive networking (TSN) and time sensitive communication (TSC).

The 5G wireless communication system includes supporting of a connected industry. Such 5G connectivity may become the basis of dynamic force for digitalization of the next term and industrial field in the future. In the environment of such industrial field, a large number of 5G connectivity-based UEs may be connected to each other, and the massive industrial wireless network may support a small-sized UE showing relatively low performance, in addition to URLLC services of a high requirement, and may provide battery life that enables complete operation during several years. Actually, the services may have a feature of having a higher requirement than LPWA such as NB-IoT or LTE-M, but having a lower requirement than eMBB or URLLC.

Similar to the above-described connected industry, 5G connectivity may be utilized as the basis for next generation smart city innovation. For example, in the case of utilizing a smart city, 5G connectivity may be effectively utilized for collecting data within a city, and utilizing and monitoring resources in a city. Specially, installation of a surveillance camera may be used for important/essential roles in an industrial area as well as a city. In addition, a wearable device, for example, a smart watch, a ring, a health-related device, and the like may be considered as one of the cases utilizing a small-sized device.

Therefore, as the requirements from a technical perspective in consideration of the above-described scenario, utilization cases, and the like, relatively low UE costs and complexity may be required for the connection of a UE, compared to eMBB or URLLC UE of Rel-15 or Rel-16, and a size having a compact form factor may be required for the size of a UE, and frequency range 1 (FR1) and FR2 bands for FDD and TDD may be considered as an installation environment.

In the case of an industrial wireless sensor, it is assumed that a communication service availability is 99.99%, an end-to-end latency is less than 100 ms, and a reference bitrate for all use cases is less than 2 Mbps (e.g., considering a latently asymmetrical case such as uplink traffic relatively higher than the downlink), and a UE is stationary, and a battery needs to be maintained at least several years. In the case of a security related sensor, a requirement for a latency of less than 5 to 10 ms may be considered.

In the case of video surveillance, an economical video bitrate of 2 to 4 Mbps, a latency of less than 500 ms, and a reliability of 99% to 99.9% are considered as a reference. In the case of a high-end video, a bit rate of 7.5 to 25 Mbps may be considered, and a traffic pattern in which uplink transmission is dominant, compared to a downlink, may be considered. For example, a video camera device such as a CCTV may be a device with upper-medium capability that is difficult to be supported by legacy LPWA technology such as NB-IoT and eMTC. Specifically, a CCTV is one of the models of the configuration of a smart city and shows a growth trend, and many companies participate in producing related manufactures and have a great interest in the connectivity among the devices.

In the case of a wearable device, for a smart wearable application, a reference bitrate of 10 to 50 Mbps in the downlink and a reference bitrate of at least 5 Mbps in the uplink may be considered, and a peak bitrate of 150 Mbps in the downlink and a peak bitrate of 50 Mbps in the uplink may be considered.

As described above, for an RC UE or an RC NR, a new IoT technology may be required that is incapable of being supported by a legacy eMTC (or LTE-M) or NB-IoT. Specifically, a relatively lower latency and a relatively higher data rate and reliability are required than an eMTC or NB-IoT UE, relatively lower costs and complexity and a relatively longer battery life are required than an eMBB UE, and supporting coverage relatively wider than that of a URLLC UE is required.

Hereinafter, a random access procedure in an NR system related to the disclosure will be described.

Figure 3:
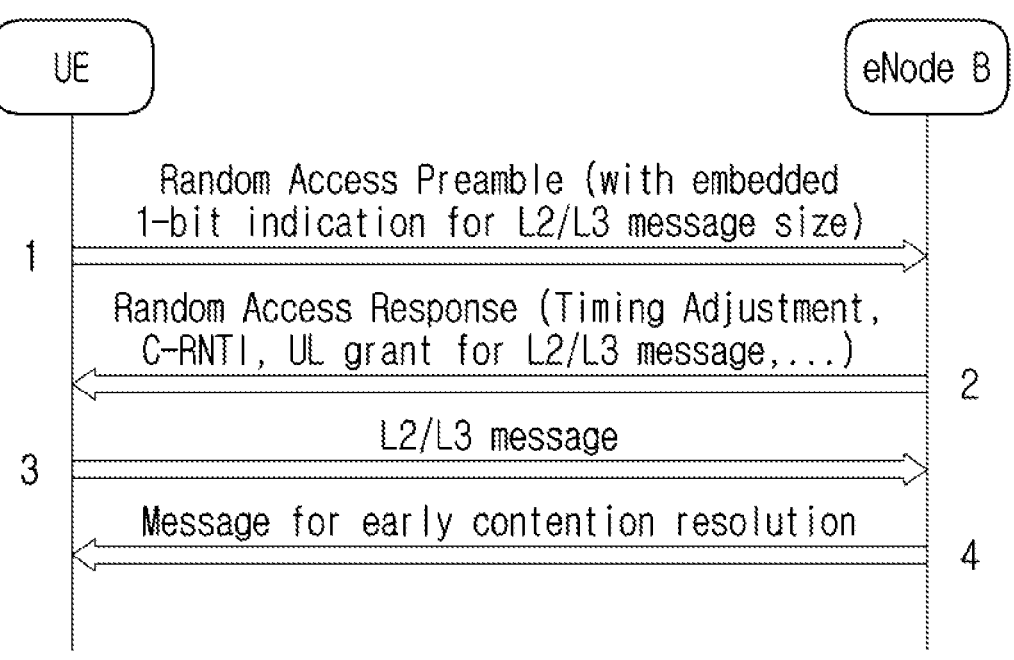
FIG. 3 is a diagram illustrating an NR random access procedure to which the disclosure is applicable.

FIG. 3 is a diagram illustrating an NR random access procedure to which the disclosure is applicable.

A random access procedure may be used when a UE obtains uplink (UL) synchronization with a base station, or receives a UL resource allocated.

A contention-based (CB) random access procedure may include a first step in which a UE transmits a random access preamble (or Msg1) to a base station, a second step in which the UE receives a random access response (RAR) (or Msg2) from the base station, a third step in which the UE transmits a second layer/third layer (L2/L3) message (or Msg3) to the base station, and a fourth step in which the UE receives a contention resolution message (or Msg4) from the base station. Additionally, a contention-based random access procedure that only uses two steps may also be included. The 2 step-based contention-based random access procedure may include step A in which the UE transmits, to the base station, a random access preamble and a random access-related message via an uplink channel, and step B in which the UE receives a random access response, a contention resolution message, and the like from the base station.

A contention-free (CF) random access procedure may include only the first and second step of the CB random access procedure, and contention does not occur between UEs and thus, the third step and the fourth step are not required.

The random access procedure may be initiated by the occurrence of a trigger event and an accompanying initialization operation.

Specifically, the random access procedure may be initialized by a PDCCH order, a MAC sublayer, an RRC sublayer, or a beam failure indication from a physical (PHY) layer. The relationship between a specific cause that triggers random access and a corresponding event in the NR system may be listed in Table 4 below.

Common) or the like, BWP-UplinkCommon may include an IE such as RACH-ConfigCommon or the like, and RACH-ConfigCommon may include random access configuration related information.

Specifically, as the random access configuration related information, following information may be provided to UEs.

Prach-ConfigIndex: an available set of RPACH resources (e.g., PRACH occasions) for transmission of a random access preamble;

PreambleReceivedTargetPower: initial random access preamble power;

rsrp-ThresholdSSB: an RSRP threshold value for selecting an SSB;

rsrp-ThresholdCSI-RS: an RSRP threshold value for selecting a CSI-RS;

rsrp-ThresholdSSB-SUL: an RSRP threshold value for selecting a carrier between a normal uplink (NUL) carrier and a supplementary uplink (SUL) carrier;

powerRampingStep: a power-ramping factor;

ra-PreambleIndex: a random access preamble index;

preambleTransMax: the maximum number of times of preamble transmission;

ra-Response Window: the size of a time window for monitoring an RAR (indicated to a UE using the number of slots);

a random access preamble set for requesting system information (SI) and/or a corresponding PRACH resource (when needed)

ra-ContentionResolutionTimer: a contention resolution timer;

TABLE 4

Mapping between the events and the cause that triggers the RA procedure in NR

| Event | Initiated by | Note |
|---|---|---|
| Initial access from RRC_IDLE | MAC sublayer | RRCConnectionRequest triggers R-BSR |
| RRC Connection Re-establishment | MAC sublayer | RRCConnectionReestablishmentRequest triggers R-BSR |
| Handover | MAC sublayer | RRCConnectionReestablishmentRequest triggers R-BSR |
| DL data arrival | PDCCH order | NW triggers random access |
| UL data arrival | MAC sublayer | New data arrival triggers R-BSR |
| Positioning | PDCCH order | NW triggers random access |
| PSCell management | RRC sublayer | R-BSR triggerd by RRCConnctionReconfigurationComplete does not initiate random access in PSCell |
| STAG management | PDCCH order | NW triggers random access in SCell |
| Beam Failure | Beam Failure indication | BF indication from a lower layer |
| On demand SI | MAC sublayer | RRC trigger R-BSR |

A random access procedure in a secondary cell (SCell) excluding a primary secondary cell (PSCell) may be initialized only by a PDCCH order, and a random access preamble index value may be indicated by the PDCCH order. Here, the PSCell may be a primary cell (PCell) in a master cell group (MCG) or a secondary cell group (SCG) in the case of dual connectivity.

In addition, via the RRC signaling, random access configuration related information may be provided to UEs. For example, one or more pieces of information in the random access configuration related information may be provided to UEs via system information block 1 (SIB1). For example, SIB1 may include an information element (IE) such as ServingCellConfigCommonSIB or the like, ServingCellConfigCommonSIB may include an IE such as UplinkConfigCommonSIB or the like, UplinkConfigCommonSIB may include an IE such as initialUplinkBWP (or BWP-UplinkgroupBconfigured: whether to configure random access preamble group B;

numberOfRA-PreamblesGroupA: the number of random access preambles belonging to random access preamble group A In the case that preamble group B is configured, the preambles remaining after excluding numberOfRA-PreamblesGroupA preambles belong to group B.

In this regard, depending on whether a mapping relationship between each SSB (or CSI-RS) and a preamble transmission resource and index is set in advance, a preamble index group and the indices included in the group may be sequentially allocated to each SSB (or CSI-RS). A preamble group may be used when a base station estimates the size of a UL resource required for Msg3 transmission. That is, in the case that preamble group B is configured for a UE, if the size of Msg3 that the UE desires to transmit is greater than a predetermined Msg3 threshold size (e.g., a value determined by a ra-Msg3SizeGroupA parameter, and the size of UL data information including a MAC header and MAC CEs), and a pathloss value is less than "serving cell's PCMAX-preambleReceivedTargetPower-msg3-DeltaPreamble-messagePowerOffsetGroupB", wherein the serving cell performs random access, the UE may select a preamble index from group B and may transmit a preamble. If the base station recognizes that a preamble belonging to group B is received, the base station may include information associated with the size of a UL resource needed for Msg 3 transmission in Msg2 that is response information with respect to the corresponding preamble, and may schedule the same for the UE. That is, in random access preamble transmission, a 1-bit indicator associated with the size of Msg 3 (i.e., L2/L3 message) may be embedded. Otherwise (i.e., the size of Msg3 that the UE desires to transmit is less than or equal to the predetermined Msg3 threshold size, or the pathloss value is greater than or equal to "serving cell's PCMAX-preambleReceivedTargetPower-msg3-DeltaPreamble-messagePowerOffsetGroupB"), the UE may select a preamble index from group A and may perform preamble transmission. From the view of the base station, the base station may expect potential preamble reception in all preamble indices configured in a preamble group in configured RACH occasions, and may perform an associated preamble reception operation.

When initializing the random access procedure, the UE may empty an Msg3 buffer, may set a preamble transmission counter to 1, may set a preamble power ramping counter to 1, and may set a preamble backoff to 0ms. Subsequently, if a carrier on which a random access procedure is to be performed is explicitly signaled, a random access procedure may be performed on the corresponding carrier. Otherwise, if an SUL is configured in a cell for a random access procedure, and the RSRP value of a downlink (DL) pathloss of the corresponding cell is less than an rsrp-ThresholdSSB-SUL value, the SUL may be selected as a carrier for performing a random access procedure and a PCMAX (the maximum UE transmission power) value for the SUL may be set. Otherwise, an NUL carrier is selected as a carrier for performing a random access procedure, and a PCMAX value for the NUL carrier may be set.

Subsequently, the UE may set a preamble index value via a resource select procedure, and may determine a subsequently available associated PRACH occasion. More specifically, a PRACH occasion may be determined based on the case in which an association configuration is present between an SSB block index and a PRACH occasion, the case in which an association configuration is present between a CSI-RS and a PRACH occasion, or the case in which the association configurations are not provided to the UE. In the case that an association configuration is present between an SSB/CSI-RS and a PRACH occasion, a PRACH occasion that is associated with an SSB or a CSI-RS selected by the UE may be determined. If an association configuration is not present between an SSB/SI-RS and a PRACH occasion, the UE may perform preamble transmission in a subsequently available PRACH occasion.

Subsequently, the UE may perform preamble transmission based on the selected PRACH occasion. Specifically, MAC may provide a selected preamble, an associated radio network temporary identifier (RNTI), a preamble index, reception target power to PHY, and may indicate performing the transmission of the selected preamble.

After transmitting the preamble, the UE needs to monitor reception of Msg2 (or RAR) corresponding thereto, and a time (window) interval for the same may be defined by ra-ResponseWindow. The UE may expect reception of an RAR within a predetermined number of symbols after transmitting the preamble, and may perform PDCCH/PDSCH monitoring in association with Msg2 during the period of time corresponding the window interval.

More specifically, RAR information may be transmitted in the form of a MAC PDU via a PDSCH from the base station, and the UE may monitor a PDCCH based on a random access (RA)-RNTI value in order to receive the PDSCH. That is, the PDCCH may include information associated with a UE that needs to receive a PDSCH, information associated with PDSCH transmission resource, a PDSCH transmission format, and the like. In addition, the RAR may include a random access preamble identifier (RAPID), an uplink (UL) grant indicating an Msg3 transmission resource, a temporary cell identifier (temporary cell (C)-RNTI)), a timing adjustment/advance command (TAC), and the like.

In the case that response information (e.g., RAPID) is included in the received Msg2, the UE considers the case as successful RAR reception. Otherwise, the UE may perform the above-described preamble resource selection again in order to retransmit a preamble.

The UE may perform Msg3 transmission based on parameter information for Msg3 transmission, such as UL grant information in the received Msg2. Upon performing of Msg3 transmission, the UE starts a contention resolution timer (CR timer), and performs cell(C)-RNTI-based PDCCH monitoring for receiving Msg4. In the case that Msg4 is received while the CR timer operates, the UE may determine that contention resolution is successfully performed.

Hereinafter, examples of the disclosure associated with a random access procedure in an RC NR system will be described.

In the legacy NR system, normal UEs having high-end UE capability for eMBB and/or URLLC service are present. However, UEs having medium-low UE capability are employed for services such as industrial wireless sensor services, video surveillance services, wearable equipment services, and the like (i.e., reduced capability/complexity (RC) UEs), UEs having various capability levels may be mixedly present in the NR network. For example, an RC UE may have capability characterized in that the number of transmission antennas and the number of reception antennas are limited to 1, respectively, a bandwidth is reduced, a low transmission power class is assigned, or a restricted half duplex is applied.

In this case, there are UEs having different channel environments and different levels of capability in a single cell, and thus the base station (e.g., an NG-RAN) may need to identify different capability levels of the corresponding UEs promptly from the initial cell access process. A cell coverage or a resource allocation scheme that a legacy base station sets based on a UE (e.g., a high-end capability UE, hereinafter, referred to as a "normal UE" or a "first type UE") that supports NR eMBB, URLLC, and/or a wideband may not be appropriate for a new type of UE (e.g., a medium-low capability UE, hereinafter, referred to as an "RC UE" or a "second type UE") that is incapable of supporting eMBB, URLLC, and/or broadband (e.g., supporting a narrow band).

For example, if the base station is capable of being aware of the coverage level (e.g., repetition level) of the RC UE in advance during the initial cell selection (or initial access) process, resource utilization for various types of base station-UE transmission and reception performed in the initial access process may be optimized. For example, during the random access process, if the base station is capable of identifying an RC UE in advance by distinguishing the same from a normal UE (e.g., a Rel-15 and/or Rel-16 UE (or an eMBB, URLLC, and/or wideband UE)), the base station may be capable of optimizing utilization of resources for base station-UE transmission and reception after the random access process, and may also secure the reliability of reception and coverage of the RC UE.

As described above, in order to minimize or limit deterioration in performance caused due to a decrease in UE complexity, a coverage recovery function for compensating for a latent decrease in coverage caused due to a decrease in UE complexity is required. To this end, a network or a network operator is required to explicitly identify an RC UE, and securing the coexistence of a normal UE and an RC UE is required.

The disclosure includes examples associated with random access for an RC UE.

A base station may transmit an SSB based on a predetermined transmission pattern. The SSB may include a synchronization signal (SS) and a physical broadcast signal (PBCH), the SS may include a primary synchronization signal (PSS) and a secondary synchronization signal (SSS), and the PBCH may include a PBCH demodulation reference signal (DMRS), and PBCH data.

A physical signal or a physical channel that the UE transmits first in the uplink after receiving an SSB and SIB1 from the base station in the initial access process is a random access preamble (or PRACH or Msg1). Based on the SSB transmitted from the base station, each UE that operates in the NR system may select an optimal SSB index (e.g., the index of an SSB having the highest SSB-RSRP) appropriate for a corresponding channel environment.

Here, unlike a normal UE (e.g., a Rel-15 and/or Rel-16 UE (or an eMBB, URLLC, and/or wideband UE)), the RC UE may need to perform SSB monitoring or measurement during a longer period of time. In the situation in which reception levels or reception coverage of an SSB and SIB1 are the same, the RC UE may need to receive an SSB and/or SIB1 during a longer period of time than the normal UE, in order to identify corresponding information. After identifying the SSB and SIB1 information, the RC UE may perform a random access procedure including random access preamble transmission using random access configuration related information provided via the selected SSB index (or an CSI-RS index in the RRC CONNECTED mode) and SIB 1.

In order to provide, to the RC UE, coverage similar to that of the normal UE, a function of compensating for a coverage loss and a decrease in the reliability of reception caused due to a reduced capability or a reduced complexity of the RC UE. For example, random access preamble transmission is a signal that a UE transmits first to a base station. Accordingly, in order to provide coverage compensation or a stable radio access function to an RC UE, the base station may need to recognize, in advance, whether the corresponding UE is an RC UE (or whether an RC UE is present) in the initial access or random access process, and may perform data transmission specialized for the corresponding UE. According to an existing procedure defined conventionally, it is difficult to explicitly identify the capability of a UE during an initial access or random access procedure, and the capability of the UE is capable of being identified when a base station receives a signaling associated with the capability of the UE after the initial access or random access procedure.

Therefore, there is a desire for a new method that enables a base station to identify whether a corresponding UE is an RC UE via random access preamble transmission by which the UE performs uplink transmission to the base station. Accordingly, via uplink and downlink transmission, such as an RAR (or Msg2), an L2/L3 message (or Msg3) and a contention resolution message (or Msg4), and the like, that are performed after random access preamble transmission by the UE, an additional or improved method such as coverage compensation, optimization of the use of resources, and the like may be applied to the corresponding UE.

In the examples of the disclosure as described below, a random access operation may be defined for identifying an RC UE by distinguishing the same from a normal UE from the perspective of system information transmission, transmission carrier selection, preamble selection, and configuration of a RACH occasion (RO).

System information transmission

A base station may provide a common (or cell-specific) system parameter to both a normal UE and an RC UE via a common channel (e.g., a PDCCH and a PDSCH) by transmitting system information (e.g., SIB1) including random access configuration related information.

For example, the base station identifies an RC UE by distinguishing the same from a normal UE, and may independently perform optimal SIB1 transmission to each of the normal UE and the RC UE. That is, SIB1 information for the RC UE may be configured in a size smaller than the size of SIB1 information for the normal UE. Parallelly or separately, SIB1 PDCCH/PDSCH that provides the same system information for the RC UE may be repeatedly transmitted at transmission intervals (e.g., 20, 40, 80 ms) shorter than 160 ms that is the transmission interval of a PDSCH including SIB1 and a PDCCH for SIB1 scheduling (hereinafter, SIB1 PDCCH/PDSCH) for the normal UE.

In addition, in the case that SIB1 information and/or a transmission interval is set separately by distinguishing a normal UE and an RC UE, signaling overhead may be increased and the efficiency of the use of resources may deteriorate from the perspective of a cell. Therefore, without distinguishing a normal UE and an RC UE, common SIB1 may be transmitted according to the same method. In this case, to perform compensation associated with reception coverage and reliability, and the like for the RC UE, the RC UE may receive SIB1 during a longer period of time than the normal UE. Accordingly, it is expected that SIB1 reception by the RC UE has a longer latency than the normal UE.

Selection of transmission carrier

A UE may select a transmission carrier (Tx carrier) for performing random access.

In the case of a normal UE, for example, in the case of a wideband UE for which an SUL is additionally configured, an SUL or NUL may be selected depending on whether the RSRP value of a downlink pathloss is less than, or is greater than or equal to rsrp-ThresholdSSB-SUL in the random access configuration related information, and a $P_{CMAX}$ value may be set based on the same.

In the case of an RC UE (if the RC UE is configured with an SUL), a Tx carrier for random access may be selected between an SUL and the NUL based on at least one of a coverage level, a repetitive transmission level (repetition level), the type of UE, and a UE category, in addition to the above-mentioned method of comparing a downlink pathloss and the set threshold value (i.e., a method of selecting an SUL Tx carrier if the RSRP value of the downlink pathloss is less than the threshold value, and otherwise, selecting an NUL Tx carrier.) For example, an RC UE corresponding to the case in which the RSRP value of the downlink pathloss is less than the threshold value, and a coverage level/repetitive transmission level is greater than or equal to a predetermined level (i.e., the situation that requires a high coverage level) may use an SUL carrier. Otherwise, the RC UE may use an NUL.

In addition, a new Tx carrier selection threshold value (e.g., rsrp-ThresholdSSB-SUL-RCNR) may be set for an RC UE, that is different from a Tx carrier selection threshold value for a normal UE (e.g., rsrp-ThresholdSSB-SUL).

Alternatively, a Tx carrier selection threshold value (e.g., rsrp-ThresholdSSB-SUL) may be set for a normal UE and an RC UE in common, and the RC UE may select a Tx carrier for random access between an SUL and an NUL based on at least one of a downlink pathloss, a coverage level, a repetitive transmission level, the type of UE, and a UE category.

Alternatively, in the case that an SUL is configured for an RC UE, an SUL may be always selected as a Tx carrier for random access, irrespective of a Tx carrier selection threshold value.

Alternatively, via higher layer information, a UL carrier that is one of the carriers (NUL or SUL) configured for a single service cell may be immediately configured for an RC UE as a carrier for random access.

Selection of preamble

An RC UE that receives random access configuration related information via system information (e.g., SIB1) obtained from a base station may determine parameter values for performing random access.

Part of system information (e.g., SIB1) related to random access configuration related information to which the examples of the disclosure is applicable may be listed as shown in Table 5. However, the parameters included in Table 5 is merely an example, the random access configuration related information may be configured with the whole or part of them, and an unmentioned parameter may be additionally included in the random access configuration related information.

for an RC UE. For example, the parameter for the RC UE may include the number of times that a random access preamble (or Msg1) is repeatedly transmitted (e.g., numRepetitionPerPreamble), and a parameter (e.g., groupCconfigured, ra-Msg3 SizeGroupA, messagePowerOffset-GroupC, numberOfRA-PreamblesGroupB, sub-group-list, numberOfRA-PreamblesSubGroup, and the like) related to a new preamble group (e.g., group C) for the RC UE.

groupCconfigured: indicating whether to configure preamble group C ra-Msg3SizeGroupA: a threshold value for the size of Msg3 for selecting preamble group C messagePowerOffsetGroupC: an offset for preamble transmission power in preamble group C numberOfRA-PreamblesGroupB: the number of preamble indices in preamble group B sub-group-list: a sub-group list in preamble group C (when needed)

numberOfRA-PreamblesSubGroup: the number of preamble indices that belong to each sub-group Here, the number of times that a random access preamble is repeatedly transmitted and a parameter related to adjustment of transmission power may be used for the purpose of compensation associated with coverage for an RC UE having a low transmission capability from the perspective of uplink transmission.

Based on signaling by a base station (e.g., system information or dedicated RRC signaling), a UE may determine at least the number of times that a random access preamble is repeatedly transmitted (or a repetitive transmission level) and/or a transmission power offset value. Alternatively, in the case that a mapping relationship between the number of times of repetitive preamble transmission and a preamble index/RO is defined, a UE may select a preamble corresponding to a corresponding repetitive transmission level and/or transmission power offset value based on measured channel information and channel measurement threshold

TABLE 5

SIB1>ServingCellConfigCommonSIB>>UplinkConfigCommonSIB>>>initialU
plinkBWP (BWP-UplinkCommon)>>>>RACH-ConfigCommon>>>>>>>>
RACH-ConfigGeneric>>>>>>>>>>>>>prach-
ConfigurationIndex>>>>>>>>>>>>>msg1-FDM>>>>>>>>>>>>>msg1-
Frequency Start>>>>>>>>>>>>
zeroCorrelationZoneConfig>>>>>>>>>>>>>preambleReceivedTargetPower>>>
>>>>>>>>>
preambleTransMax>>>>>>>>>>>>>powerRampingStep>>>>>>>>>>>>>ra-
ResponseWindow>>>>>>>>totalNumberOfRA-Preambles>>>>>>>>>ssb-
perRACH-OccasionAndCB-
PreamblesPerSSB>>>>>>>>groupBconfigured>>>>>>>>>>>>>ra-
Msg3SizeGroupA>>>>>>>>>>>>>messagePowerOffsetGroupB>>>>>>>>>>>>
> numberOfRA-PreamblesGroupA>>>>>>>> ra-
ContentionResolutionTimer>>>>>>>> rsrp-ThresholdSSB>>>>>>>> rsrp-
ThresholdSSB-SUL>>>>>>>>prach-RootSequenceIndex>>>>>>>> msg1-
SubcarrierSpacing>>>>>>>>restrictedSetConfig>>>>>>>> msg3-
transformPrecoding>>>>>>>>rsrp-ThresholdSSB-repetition>>>>>>>>
groupCconfigured>>>>>>>>>>>>>ra-
Msg3SizeGrouDA>>>>>>>>>>>>>messagePowerOffsetGroupC>>>>>>>>>>>>
> numberOfRA-PreamblesGroupB>>>>>>>>>>>> offsetOfRA-
PreamblesGroupC>>>>>>>>>>>>> numRepetitionPerPreamble>>>>>>>>>>>>
sub-group-list>>>>>>>>>>>> numberOfRA-
PreamblesSubGroup>>>>>>>>>>>>>>>>...>>>>>>>> ssb-perRACH-
OccasionAndCB-PreamblesPerSSB-RCNR...

If a normal UE and an RC UE share the same system information, the cell-specific (or UE-common) random access configuration related information as shown in Table 5 may include a parameter for a normal UE and a parameter values set for each repetition level, as described below. In addition, the UE may determine a repetition level based on a configuration for an SSB index (or SSB indices) that shares the same RO(s).

Alternatively, based on channel information (e.g., the RSRP of a downlink pathloss), transmission power, a transmission power offset, a power class, the type of UE, a UE category, and the like measured by a UE itself, the UE may determine the number of times that a random access preamble is repeatedly transmitted (or a repetitive transmission level) based on a predetermined threshold value set or defined for the UE in advance. Alternatively, a mapping relationship between the number of times of repetitive preamble transmission and a preamble is defined, a UE may select a preamble corresponding to the corresponding repetitive transmission level.

For example, in the case that a UE determines the number of times that a random access preamble is repeatedly transmitted (or a repetitive transmission level) based on the RSRP value of a downlink pathloss, a predetermined threshold value (e.g., rsrp-ThresholdSSB-repetition) set for the UE may be applied. In the case that the measured RSRP value of a downlink pathloss is less than the predetermined threshold value, the UE may transmit a random access preamble repeatedly i times (or may select a preamble corresponding to a repetitive transmission of i times, and may perform repetitive transmission). In the case that the measured RSRP value of a downlink pathloss is greater than or equal to the predetermined threshold value, the UE may transmit random access preamble repeatedly j times (or may select a preamble corresponding to a repetitive transmission of j times, and may perform repetitive transmission). Here, the values of i (i is greater than or equal to 1) and j (j is greater than or equal to 1) may be set or defined for the UE in advance. In addition, In addition, the UE may determine the size (level) of an offset value of transmission power by comparing the RSRP value of a downlink pathloss and a predetermined threshold value, in addition to determining the number of times of repetitive transmission performed.

Here, repetitive random access preamble transmission may be different from preamble retransmission that is performed when at least an RAR is not successfully received after transmission of a preamble, or when a preamble is not successfully received by a base station. That is, unlike the conventional case that performs preamble transmission one time, the repetitive transmission considered in the disclosure is an operation associated with multiple times of repetitive transmission that may be considered in the case of transmitting preamble transmission one time.

In addition, the number of times that a random access preamble is repeatedly transmitted may be determined based on the type of UE (or a UE category or UE capability) in addition to comparing the measured RSRP value of the downlink pathloss and a threshold value thereof. Here, the above-mentioned type of UE (or a UE category or UE capability) may be taken into consideration in order to distinguish the transmission/reception capability of an RC UE (e.g., the maximum supportable bandwidth, whether a half-duplex mode is available, the number of antennas, whether MIMO transmission is performed, and the like), transmission power, a transmission power offset, a power class, and the like, and it is assumed that the types of UEs may have different UE characteristics and capability levels from each other. In addition, the RC UE may determine the number of times of preamble transmission, which differs depending on a random access procedure-related method (i.e., 4-step CBRA, 2-step CBRA or 4-step CFRA, 2-step CFRA). Particularly, in the case of 2-step CBRA and 2-step CFRA, preamble transmission and uplink message (PUSCH) transmission are performed together, and thus the number of times of repetitive transmission may be determined independently based on the above-described method for successful reception of a preamble and an uplink message.

RO Configuration

A RACH occasion or PRACH occasion (RO) corresponds to a resource in which a UE is capable of performing random access preamble transmission. An RO may be defined by a time domain resource and a frequency domain resource. The time domain resource related to an RO configuration may be referred to as a PRACH slot, and the PRACH slot may correspond to one or more time slots or a plurality of OFDM symbols in a single slot according to the format of a preamble format (e.g., a short preamble format or a long preamble format). The frequency domain resource related to an RO configuration may be defined in units of subcarrier resource elements (RE), in units of resource blocks (RB), or in units of bandwidth parts (BWP), and the size thereof may be determined based on the length of a preamble sequence.

In the examples of the disclosure, the RO of a normal UE and the RO of an RC UE may be referred to as a first RO and a second RO, respectively. For example, the first RO and the second RO may be configured to partially overlap or to have an RO in common. That is, the whole or a part of the first RO for the normal UE may be configured as the second RO for the RC UE, and a partially overlapping or common RO may use any of the normal UE or the RC UE. Alternatively, the first RO and the second RO may be configured to be separate. That is, the second RO that is distinguished from the first RO for the normal UE in the time and/or frequency domain may be configured in addition to the first RO. Alternatively, the first RO may include a normal UE-dedicated RO and an RO shared with an RC UE, and the second RO may include an RC UE-dedicated RO and an RO shared with a normal UE.

In addition, some of the parameters included in Table 5 may be included or excluded depending on whether the first RO and the second RO for a normal UE and an RC UE are configured to have an RO in common or to partially overlap, or to be separate.

The first RO and the second RO for the normal UE and the RC UE may be configured for a UE(s) by a base station.

In the case of an RO configuration, a base station may additionally provide RO masking information associated with the whole or some of configured ROs. Masking information may indicate whether an RO(s) corresponding to a predetermined index (indices) is available among configured ROs. For example, if the first RO is configured for a normal UE, the second RO is configured for an RC UE, and masking information is additionally provided, the RC UE may determine an available RO in consideration of the masking information. The available RO of the RC UE and the available RO of the normal UE may have an RO in common, may partially overlap, or may be totally different from each other. If masking information is not provided, the RC UE may determine the second RO as an available RO. That is, the available ROs of the normal UE and the RC UE may be basically determined based on first and second RO configurations, and if additional masking information is provided, an available RO may be finally determined by additionally applying the same. In addition, in the case that masking information is provided, whether the first RO and the second RO overlap may be finally determined based on the masking information. Therefore, in the descriptions below, the first RO and the second RO may be available ROs for the normal UE and the RC UE, respectively, that are determined by applying masking information if the masking information is provided.

For example, in the case that the first RO and the second RO are configured to partially overlap or to have an RO in common, a base station may perform configuration based on masking information (e.g., rc-ssb-sharedROmaskindex) so that a subset or a universal set of an RO that the normal UE uses is shared with the RC UE. In this case, the first RO and the second RO may be configured to have an intersection. Alternatively, the first RO may be configured to include the entirety of the second RO, or the first RO and the second RO may be configured to be an identical set. ROs that RC UEs are capable of actually using for preamble transmission may be indicated via the masking information (or an RO mask index) among a first RO and a second RO associated for each configured SSB (or CSI-RS). That is, ROs that the normal UE and the RC UE are capable of using may be distinguished via the above-described parameters or may be independently indicated, and based on the indication, ROs of the normal UE and the RC UE may be freely configured so as not to overlap, to partially overlap, or to be identical.

Hereinafter, a first RO and a second RO are taken into consideration, and respective ROs may be separately indicated using independent RO mask configurations based on independent RO configurations or the identical RO configuration. In this case, the first and second ROs indicated based on mask configurations may be configured to have an RO in common/to partially overlap or not to overlap as described below.

Hereinafter, based on system information transmission, transmission carrier selection, preamble selection, and/or RO configuration as described above, examples of the disclosure that report, to a base station, whether a corresponding UE is an RC UE during the initial access or random access procedure of the UE will be described.

Example 1

In the case that a first RO and a second RO are configured to have an RO in common or to partially overlap, Example 1 includes a scheme of reporting, to a base station, whether a UE that performs random access using a preamble index group within the overlapping RO is an RC UE.

In addition, Example 1 includes a scheme of allocating a preamble resource (e.g., a preamble group and/or index) that differs for each of a normal UE and an RC UE.

For example, preamble group A and/or group B may be allocated to the normal UE, and this is referred to as a first preamble group. Preamble group C may be allocated to an RC UE, and this is referred to as a second preamble group. That is, the case in which the first preamble group includes group A and the second preamble group includes group C, or the case in which the first preamble group includes group A and group B and second preamble group includes group C is assumed. In addition, the range of preamble indices allocated to each of the preamble group A, B, and C or the number of preamble indices for each group may be set by a base station or may be defined in advance. As described above, the scope of the disclosure is not limited to the name of a preamble group (i.e., group A, B, or C) or the range or the number of preamble indices belonging to each group, and may include allocation of a preamble group that differs for each of a normal UE and an RC UE.

In addition, the scope of the disclosure may include the case in which a single SSB (or a single CSI-RS) is associated with a single RO, the case in which a single SSB (or a single CSI-RS) is associated with a plurality of ROs, and the case in which a plurality of SSBs (or a plurality of CSI-RSs) are associated with a single RO. Hereinafter, descriptions will be provided by assuming an RO associated with an SSB for clarity. However, the following examples may be applicable to an RO associated with a CSI-RS, instead of an SSB.

Example 1-1

Figure 4:
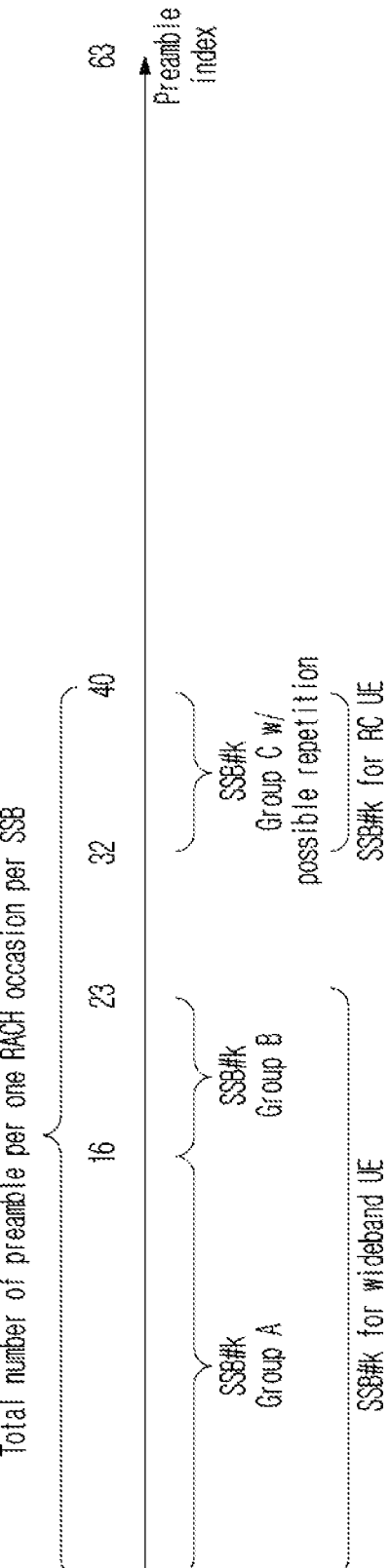
FIG. 4 is a diagram illustrating an example of a preamble group configuration to which the disclosure is applicable.

FIG. 4 is a diagram illustrating an example of a preamble group configuration to which the disclosure is applied.

Referring to FIG. 4, it is assumed that one or more ROs associated with a single SSB#k are present, and the one or more ROs are shared between a normal UE and an RC UE (i.e., a first RO and a second RO are the same set). The total number of preamble indices (or the number of preambles) per RO may be configured with respect to the one or more ROs. The total number of preambles in a single RO may be the sum of the number of preambles belonging to a first preamble group (i.e., group A and/or B) and the number of preambles belonging to a second preamble group. Alternatively, the total number of preambles in a single RO may be the number of candidate preambles that are capable of being used as the first and/or second preamble group.

In addition to the first preamble group for the normal UE, configuration information associated with the second preamble group for the RC UE may be provided to a UE(s) by a base station. For example, the base station may provide group C configuration information for the RC UE via system information (e.g., SIB1 or dedicated-RRC signaling). For example, the group C configuration information may include whether to configure group C (groupCconfigured). In the case that configuration of group C is indicated, the number of preambles obtained by subtracting the number of preambles in group B (numberOfRa-PreambleGroupB) and the number of preambles in group A (numberOfRA-Preambles-GroupA) from the total number of preambles is determined as the number of preambles in group C. Alternatively, in the case that the first preamble group includes only group A, the number of preambles obtained by subtracting the number of preambles in group A (numberOfRA-PreamblesGroupA) from the total number of preambles is determined as the number of preambles in group C.

The start index of a preamble belonging to the second preamble group (or group C) may be determined as an index next to the end index of a preamble belonging to the first preamble group (or group A and/or B).

As an additional example, an offset (e.g., offsetOfRA-PreamblesGroupC) may be configured in order to indicate the start index of a preamble belonging to the second preamble group (or group C). In this case, a preamble index that is spaced an offset value apart from the end index of a preamble belonging to the first preamble group (or group A and/or B) may be the start preamble index of the second preamble group, and preambles from the start preamble index to the end index of a preamble in all the preambles or to a preamble index corresponding to the number of preambles in the second preamble group may belong to the second preamble group. Alternatively, the start index of a preamble belonging to the second preamble group (or group C) may be directly configured, instead of using the above-described offset. Here, the start index of the second preamble group may be configured not to overlap an index that belongs to the first preamble group.

In this case, the number of preambles of the second preamble group may be determined by subtracting the number of preambles of the first preamble group (or group A and/or B) from the total number of preambles, and by further subtracting the offset or the number of indices from an index next to the first preamble group end index to an index before the second preamble group start index.

As an additional example, the second preamble group may be configured to include a predetermined number of preambles in a descending order from the end index of the entire preamble group. In this case, the predetermined number may be indicated by a base station (e.g., via system information).

For example, the total number of preambles available in a single RO is set to 41, and the available preamble indices may be set to 0 to 40. A first preamble group may be configured with preamble indices 0 to 23. Specifically, the preamble indices 0 to 16 may be configured as group A, and the preamble indices 17 to 23 may be configured as group B. In addition, the second preamble group may be configured with preamble indices 32 to 40. Such preamble group configuration is merely an example, and the scope of the disclosure is not limited thereto, and the number of preambles belonging to each group and the range of indices may be configured variously.

A UE may select a preamble group based on a predetermined criterion, and may randomly select a single preamble index within the selected preamble group.

For example, a UE may select one of the first or second preamble group based on the type of UE or UE capability of the UE itself. Specifically, a normal UE may select one preamble index from the first preamble group, and an RC UE may select one preamble index from the second preamble group.

Depending on which preamble group a preamble index that a base station receives from a UE belongs to, the type of UE or UE capability may be identified at the initial stage. For example, in the case that a random access preamble index that the base station receives from the UE belongs to the second preamble group, the base station may identify that the corresponding UE that attempts random access is an non-RC UE or an RC UE, and may identify the type of UE, the repetitive transmission level, the coverage level, and/or the UE capability of the RC UE at the initial stage.

From the perspective of the base station, the type of UE, the repetitive transmission level, the coverage level, and/or capability information may be taken into consideration in a following procedure. For example, if it is identified that the base station receives a random access preamble from the RC UE, the base station may set, apply, or consider an independent or new resource, transmission, repetitive transmission, and the like that correspond to the reduced capability of the RC UE in the following procedure. For example, a procedure after receiving the random access preamble may include exchanging of Msg2, Msg3, and Msg4 during the random access procedure, or may include configuration of a HARQ ACK/NACK transmitted from the UE via an uplink channel (e.g., a PUCCH), processing thereof, or the like.

As an additional example, the UE may select a preamble group based on the size of Msg 3 desired to be transmitted and a downlink pathloss value. The example may be applied together with or independently from selection of a preamble group based on the above-described UE type or UE capability.

Generally, the minimum magnitude of downlink/uplink transmission to RC UEs needs to be performed, so as to apply coverage and reception reliability corresponding to similar level of the normal UEs to the system. Given the above, in association with the random access procedure, the RC UE may have Msg3 provided in a size smaller than that of the normal UE. Therefore, based on a predetermined threshold value (e.g., ra-Msg3SizeGroupA) for the size of Msg3, the UE may select a preamble group.

As a specific example, in the case that the base station configures groups A, B, and C as preamble groups, the size of Msg3 may have the relationship of group B>group A>group C. In this case, the UE may select a preamble group based on the size of Msg3 desired to be transmitted, according to the condition as given in Table 6.

In the example of Table 6, in the case that a new Msg3 size is defined for an RC UE, and a MAC-subPDU format therefor is defined (i.e., in the case that an Msg3 MAC-subPDU format having a size smaller than a Msg3 size for a normal UE is defined), a condition for selecting the second preamble group (or group C) in consideration of the new Msg3 size is given.

TABLE 6

Condition 1:Msg3 size of UE < ra-Msg3 SizeGroup A, and pathloss measured by UE > [$P_{CMAX}$] – [preambleReceivedTargetPower] – [RC-msg3-Deltapreamble] – [messagePowerOffsetGroupC]; or Random access procedure is initialized for a common control channel (CCCH) logical channel, and size of corresponding CCCH service data unit (SDU) + size of MAC header is less than ra-Msg3 SizeGroup A Among the parameters in Table 6, ra-Msg3SizeGroupA is an Msg3 size associated with a preamble belonging to group A. PCMAX denotes the maximum UE transmission power value. preambleReceivedTargetPower denotes a target reception power at which the base station desires to receive a preamble. RC-msg3-Deltapreamble is a difference value associated with preamble transmission power for the RC UE (e.g., the value of a difference from preambleReceivedTargetPower). messagePowerOffsetGroupC denotes a power offset value of Msg3 associated with a preamble belonging to group C. If a power adjustment value of Msg3 associated with a preamble belonging to group C is independently set (i.e., based on a new independent parameter), RC-msg3-Deltapreamble and messagePowerOffsetGroupC may be replaced with a single parameter. For example, in the case that the size of Msg3 that the UE desires to transmit is less than or equal to ra-Msg3SizeGroupA and a pathloss measured by the UE satisfies the matters specified by the condition 1, or in the case that a size obtained by adding the size of a MAC header and the size of a CCCH SDU that the UE desires to transmit is less than ra-Msg3SizeGroupA, the second preamble group (e.g., group C) may be selected.

Alternatively, in the case that the group B is configured and a Msg3 size exceeds ra-Msg3SizeGroupA, group B may be selected. Alternatively, in the case that group B is not configured, one of the first preamble group (e.g., group A) or the second preamble group (e.g., group C) may be selected according to the condition given in Table 6.

Example 1-2

Figure 5:
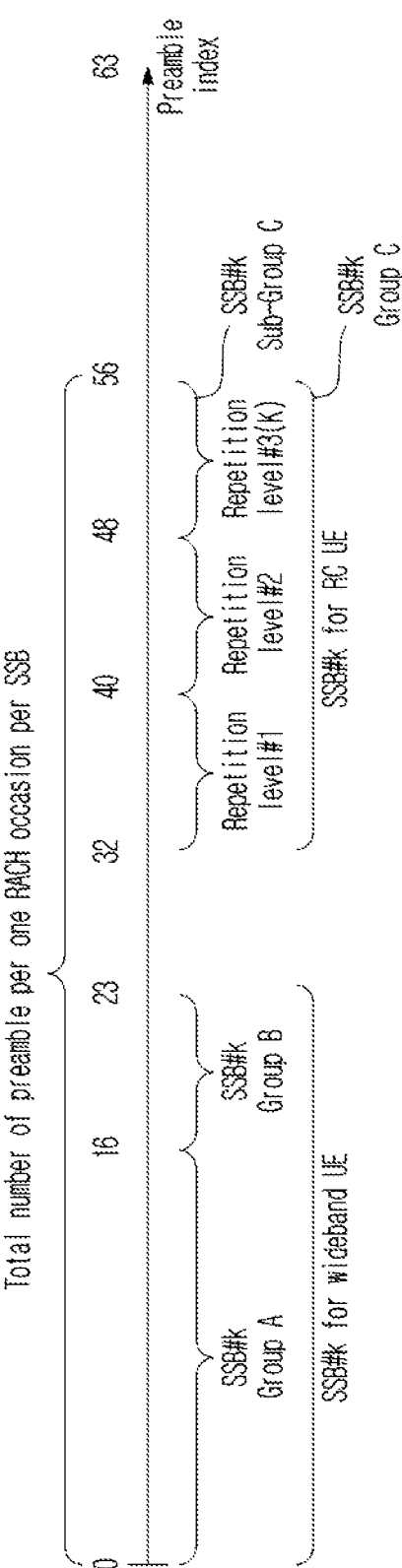
FIG. 5 is a diagram illustrating an example of a preamble group configuration to which the disclosure is applicable.

FIG. 5 is a diagram illustrating an example of a preamble group configuration to which the disclosure is applicable.

Referring to FIG. 5, similar to the example of FIG. 4, if a first RO and a second RO are shared, a first preamble group (i.e., group A and/or group B) is configured and a second preamble group (i.e., group C) may be configured for a single RO associated with a single SSB. Similar to the example of FIG. 4, group C is configured. However, unlike the example of FIG. 4, in the case of the range and the number of preambles in the example 5, group C may be configured with 25 preambles corresponding to preamble indices in the range of 32 to 56.

Specifically, in the example of FIG. 5, the number of available preamble indices in a single RO associated with SSB#k may be set to a total of 57, and the range of available preamble indices may be set to the range of 0 to 56. A first preamble group may be configured with preamble indices 0 to 23. Specifically, the preamble indices 0 to 16 may be configured as group A, and the preamble indices 17 to 23 may be configured as group B. In addition, the second preamble group may be configured with preamble indices 32 to 56. Such preamble group configuration is merely an example, and the scope of the disclosure is not limited thereto, and the number of preambles belonging to each group and the range of indices may be configured variously.

In the example of FIG. 5, the second preamble group may include a maximum of M sub-groups (M is an integer greater than or equal to 1). The sub-group may be set by a parameter such as numRepetitionPerPreamble, sub-group-list, numberOfRA-PreamblesSubGroup, or the like in Table 5. As a specific example, the number of times of repetitive preamble transmission (or a repetition level or a coverage level) may be set to a maximum of M times (e.g., M=3). That is, repetition levels 1, 2, and 3 may be set, and the number of preambles belonging to a preamble sub-group corresponding to each repetition level may be set. For example, as shown in the example of FIG. 5, repetition level 1 may be mapped to a first sub-group (e.g., preamble indices 32 to 40), repetition level 2 may be mapped to a second sub-group (e.g., preamble indices 41 to 48), and repetition level 3 may be mapped to a third sub-group (e.g., preamble indices 49 to 56).

In this manner, a preamble index group corresponding to M that is the number of one or more times of repetitive transmission (or repetition level or coverage level) may be defined. If a normal UE and an RC UE share the same RO, the preamble indices remaining after excluding the preamble indices corresponding to the first preamble group (e.g., group A and/or B) configured for normal UEs may be divided into one or more sub-groups. The sub-groups may have an one-to-one mapping relationship with different preamble repetition levels, respectively. The number of sub-groups may be set by the base station. In the case that all preambles in the second preamble group (e.g., group C) including all sub-groups are configured for the RC UE by the base station, and preamble transmission by the UE using the corresponding preamble resource or index is received by the base station, the base station may identify, in advance, that the RC UE is performing random access and may prepare a following Msg2, Msg3, and Msg4 exchanging procedure.

Figure 6:
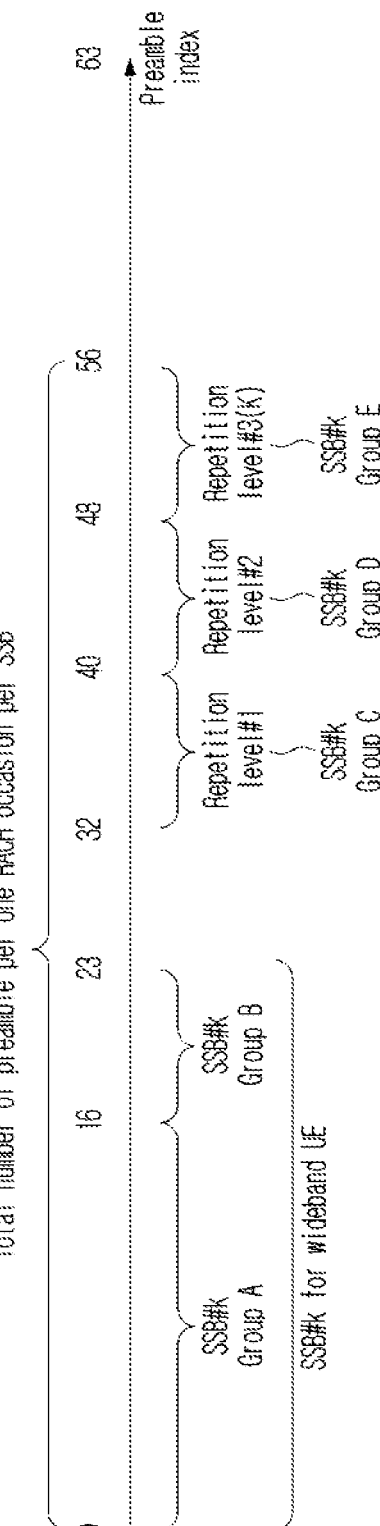
FIG. 6 is a diagram illustrating an example of a preamble group configuration to which the disclosure is applicable.

FIG. 6 is a diagram illustrating an example of a preamble group configuration to which the disclosure is applicable.

Similar to the example of FIG. 5, a first preamble group is configured in the example of FIG. 6. However, unlike the example of FIG. 5, one or more preamble groups may be configured for an RC UE. In addition, each of the one or more preamble groups for the RC UE may correspond to a single repetition level (or coverage level).

That is, unlike the example of FIG. 5, one or more sub-groups corresponding to a repetition level in the second preamble group are not configured. In the example of FIG. 6, one or more preamble groups (e.g., second, third, fourth, . . . preamble groups, or groups C, D, E, . . . ) corresponding to a repetition level may be configured for an RC UE.

In this manner, a base station may perform configuration so that a UE performs repetitive preamble transmission independently based on UE capability (e.g., repetition level)

and/or the measurement value of a downlink pathloss. Accordingly, the UE may select a preamble group (or sub-group) corresponding to repetitive transmission set/determined based on the UE capability and/or the measurement value of a downlink pathloss, may select a single preamble in the selected preamble group (or sub-group), and may transmit the same to the base station. In this case, the base station may identify a preamble group (or sub-group) which the preamble index of the preamble received from the UE belongs to (i.e., a repetition level that the corresponding UE supports), thereby roughly identifying the capability of the UE. Accordingly, the base station may perform a random access procedure including a following Msg2, Msg3, and Msg4 exchanging procedure in consideration of the capability of the corresponding UE (particularly, the RC UE).

In the case that the number of times of repetitive preamble transmission (or a repetition level or a coverage level) is set as described above, a UE may select a preamble group in consideration of the same. For example, a UE may select a preamble group based on the size of Msg3 desired to be transmitted, according to the condition as given in Table 7.

TABLE 7

| |
|---|
| Condition 2:- Msg3 size of UE < ra-Msg3 SizeGroupA, and Pathloss measured by UE > [P$_{CMAX}$] − [preambleReceivedTargetPower'] − [RC-msg3-Deltapreamble'] − [messagePowerOffsetGroupC']; or − Random access procedure is initialized for CCCH logical channel, and size of corresponding CCCH SDU + size of MAC header is less than ra-Msg3 SizeGroupA |

Among the parameters of Table 7, at least one parameter value among [preambleReceivedTargetPower'], [RC-msg3-Deltapreamble'], and [messagePowerOffsetGroupC'] may be determined based on a repetitive preamble transmission level or a repetitive Msg3 transmission level (configured for a UE or determined by a UE). That is, in the example of Table 6, [preambleReceivedTargetPower], [RC-msg3-Deltapreamble], and [messagePowerOffsetGroupC] parameters are given by a base station irrespective of a repetitive preamble transmission level or a repetitive Msg3 transmission level. However, in the example of Table 7, at least one of [preambleReceivedTargetPower'], [RC-msg3-Deltapreamble'], and [messagePowerOffsetGroupC'] may be configured by a base station or may be determined by a UE based on a repetitive preamble transmission level or a repetitive Msg3 transmission level. For example, in the case that the size of Msg3 that a UE desires to transmit is less than or equal to ra-Msg3SizeGroupA and a pathloss measured by the UE satisfies the matters specified by condition 2 (i.e., a condition that additionally takes into consideration a repetition level, compared to condition 1), or in the case that a size obtained by adding the size of a MAC header and the size of a CCCH SDU that a UE desires to transmit is less than ra-Msg3 SizeGroupA, the second preamble group (or, one of second, third, fourth, . . . preamble groups, or groups C, D, E, . . . ) may be selected.

In the case that the group B is configured and a Msg3 size exceeds ra-Msg3SizeGroupA, group B may be selected. Alternatively, in the case that group B is not configured, one of the first preamble group (e.g., group A) or the second preamble group (e.g., one of group C, the second, third, fourth . . . preamble groups, or group C, D, E . . . ) may be selected according to the condition given in Table 6.

As described above, a base station may set the number of times of repetitive transmission (or repetition level) associated with random access preamble transmission of an RC UE, via system information (e.g., SIB1 or dedicated RRC signaling). Accordingly, the UE may repeatedly transmit a preamble selected from the second preamble group (specifically, from a predetermined sub-group mapped to a repetition level in the second preamble group, or one of the second, third, fourth . . . preamble groups, or groups C, D, E, . . . ) according to the number of times of repetitive transmission (or repetition level) configured based on system information, thereby compensating for uplink coverage loss.

As described above, based on a predetermined preamble group and/or preamble index that the UE transmits, the base station may identify whether an RC UE attempts random access. In the case that random access preamble transmission from the RC UE is identified, the base station may configure a reduced message size, whether to apply repetitive transmission, and the like appropriate for the RC UE for following RAR (or Msg2) transmission. Based thereon, downlink transmission associated with the corresponding RC UE may be performed.

Example 1-3

Unlike the above-described examples assuming that one or more ROs associated with a single SSB are shared between a normal UE and an RC UE, a plurality of ROs associated with a single SSB may be present in the example, and the plurality of ROs may be configured for a normal UE, and some of the plurality of ROs may be configured for an RC UE.

To this end, it is needed to set an association relationship between an SSB and an RO. Specifically, an SSB-to-RO association for repetitive preamble transmission by an RC UE may need to be configured. Regarding the same, an initial active bandwidth part (BWP) configuration and an RO (i.e., a second RO) configuration for an RC UE will be described.

The system information (e.g., SIB1 or dedicated-RRC signaling) provided from a base station may include information indicating application of repetitive preamble transmission by an RC UE. Alternatively, based on another piece of information or another piece of system information (e.g., a preamble group and/or index, a preamble transmission power offset, and the like) provided from a base station, a repetitive preamble transmission level of a UE may be implicitly indicated.

In addition, to perform repetitive preamble transmission, a UE may need to newly define an SSB-to-RO association. In the random access procedure for a normal UE, repetitive preamble transmission is not supported. Therefore, in order to support repetitive preamble transmission in a single Msg1 transmission step (i.e., which is different from preamble retransmission performed when an RAR is not successfully received after preamble transmission), a new method of configuring and selecting an RO is required.

Preamble indices or preamble index groups corresponding to a predetermined number of times of repetitive transmission in the second preamble group for an RC UE according to the disclosure may be configured by a base station, and a preamble index or a preamble index group to be used may be configured by a base station for an RC UE. Alternatively, from among indices and/or preamble index groups corresponding to the number of times of repetitive transmission set by a base station, a UE may autonomously select a preamble index and/or a preamble index group corresponding to a predetermined number of times of repetitive transmission based a UE channel environment (e.g., the measurement value of a pathloss, a CSI, a HARQ-ACK, an SSB/CSI-RS-based RSRP/RSRQ, and the like), and/or UE capability/category/type.

In the descriptions below, it is assumed that a correspondence relationship between a preamble index (or a preamble group) associated with one or more ROs and a repetition level (the number of times of repetitive transmission) with respect to an RC UE is provided in advance. The correspondence relationship may be provided by a base station, or may be given as a predetermined rule without signaling by a base station. In addition, based on the correspondence relationship, an RO and/or a preamble (or a preamble group) corresponding to a repetition level determined by a UE may be selected. Accordingly, in the case that a base station receives a random access preamble from a UE, the base station may determine the repetition level of the corresponding UE based on at least one of the corresponding preamble index, a preamble group which the corresponding preamble belongs to, and an RO in which the corresponding preamble is received.

For example, the repetitive preamble transmission scheme according to the disclosure may perform repetitive preamble transmission finally determined via a combination of one or more preamble indices selected according to the above-described methods and one or more selected ROs mentioned below. For example, in the case that configuration/determination is performed so that only a single RO is selected by a UE, multiple times of preamble transmission may be performed by selecting one or more preamble indices in a preamble group (a second preamble group) in the corresponding RO for the repetitive preamble transmission by an RC UE. As another example, it is assumed that a preamble is selected for an RC UE for each RO selected from a plurality of ROs selected in consideration of at least one of an FDM, a TDM, or a combination of an FDM and a TDM, and repetitive transmission is performed. In this case, the values of preamble indices in a plurality of ROs associated with repetitive transmission of a single preamble by the RC UE may be selected to be the same or to be different from each other according to a predetermined rule or via additional signaling by a base station. That is, in the case of selecting ROs and a preamble index associated with repetitive transmission of a single preamble, preamble indices and/or RO resources associated with repetitive transmission of a single preamble may be determined according to a preamble rule (e.g., consecutive preamble indices or preamble indices based a rule, and consecutive ROs associated with a single SSB in the time/frequency domain) or according to higher layer signaling by a base station. Through the above, a base station reception end may easily recognize the association of repetitive transmission of a single preamble by a single RC UE, thereby clearly recognizing pieces of information obtained by receiving a correct preamble such as a random access preamble ID (RAPID) value or the like included in RAR transmission performed in the future. Particularly, the method of selecting a subsequent RO needs to equally assume the content related to the above-mentioned RO.

Figure 7:
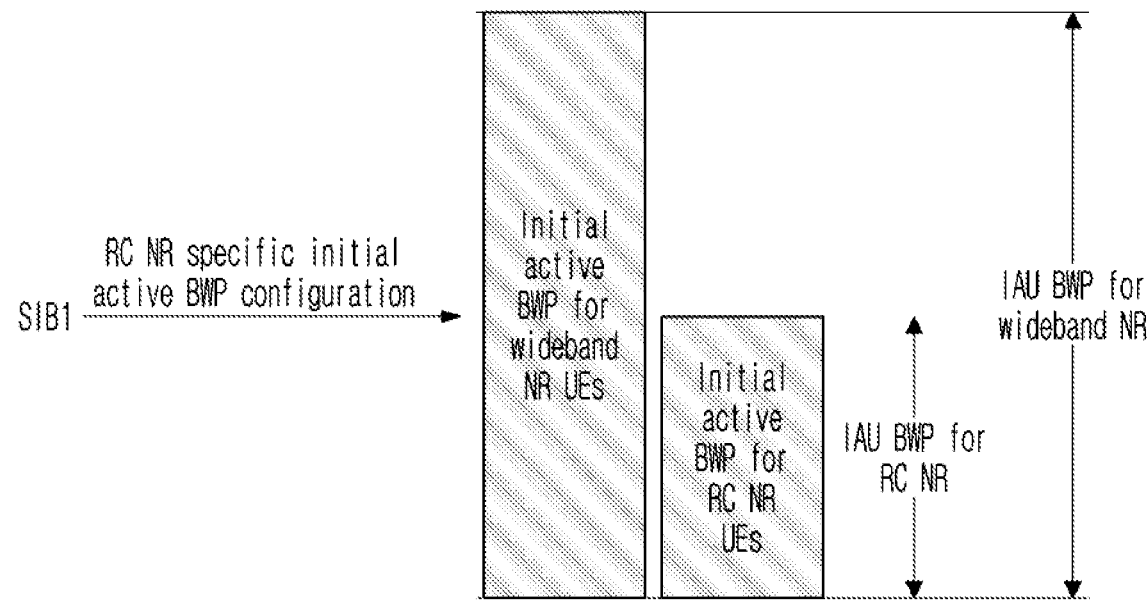
FIG. 7 is a diagram illustrating an example of an initial active bandwidth path (BWP) configuration to which the disclosure is applicable.

FIG. 7 is a diagram illustrating an example of an initial active bandwidth path (BWP) configuration to which the disclosure is applied.

An RO may be defined in a predetermined resource. For example, the predetermined resource may be defined as a BWP, and may be referred to as an active BWP. Specifically, the predetermined resource may be referred to as an initial active uplink (IAU) BWP. Subsequently, if a UE enters the RRC CONNECTED mode, a BWP configuration for an RC UE may be provided via dedicated-RRC signaling. The BWP configuration for the RC UE in the RRC CONNECTED mode may be different from IAU BWP configured at the initial access stage. Basically, the RC UE assumes that an RO is defined in a configured BWP, irrespective of the RRC CONNECTED mode. First, before describing an RO configuration, an IAU BWP configuration that is taken into consideration at the initial cell access stage will be described. Conversely, a BWP that may be configured in the RRC CONNECTED mode may have a different configuration (e.g., a bandwidth, numerology, or the like) from that of the IAU BWP. However, as described above, it is equally assumed that ROs are defined in a configured BWP.

Referring to FIG. 7, an IAU BWP (i.e., a first IAU BWP) for a normal UE (or a broadband NR UE) may be configured (an IAU BWP for FIG. 7). In addition, an IAU BWP (i.e., a second IAU BWP) for RC UEs may be configured. The first and second IAU BWPs may be independently configured via system information (e.g., SIB1 or dedicated-RRC signaling). In the case of the RRC CONNECTED mode, the second IAU BWP may be independently configured for performing random access by an RC UE via the dedicated RRC signaling.

For example, the second IAU BWP may be configured as a part of the first IAU BWP. Alternatively, a part of the second IAU BWP may be configured to overlap with a part of the first IAU BWP. Alternatively, the first IAU BWP and the second IAU BWP may be configured not to overlap each other. Alternatively, the first IAU BWP and the second IAU BWP may be configured to be identical (or configured to entirely overlap each other).

In addition, the system information may separately define a configuration parameter for the first IAU BWP and a configuration parameter for the second IAU BWP. Alternatively, the system information may define a common configuration parameter for the first and second IAU BWPs. In the case that the configuration parameter for the second IAU BWP is not defined separately, the configuration parameter for the first IAU BWP may be applied as it is as the configuration parameter for the second IAU BWP.

Figure 8:
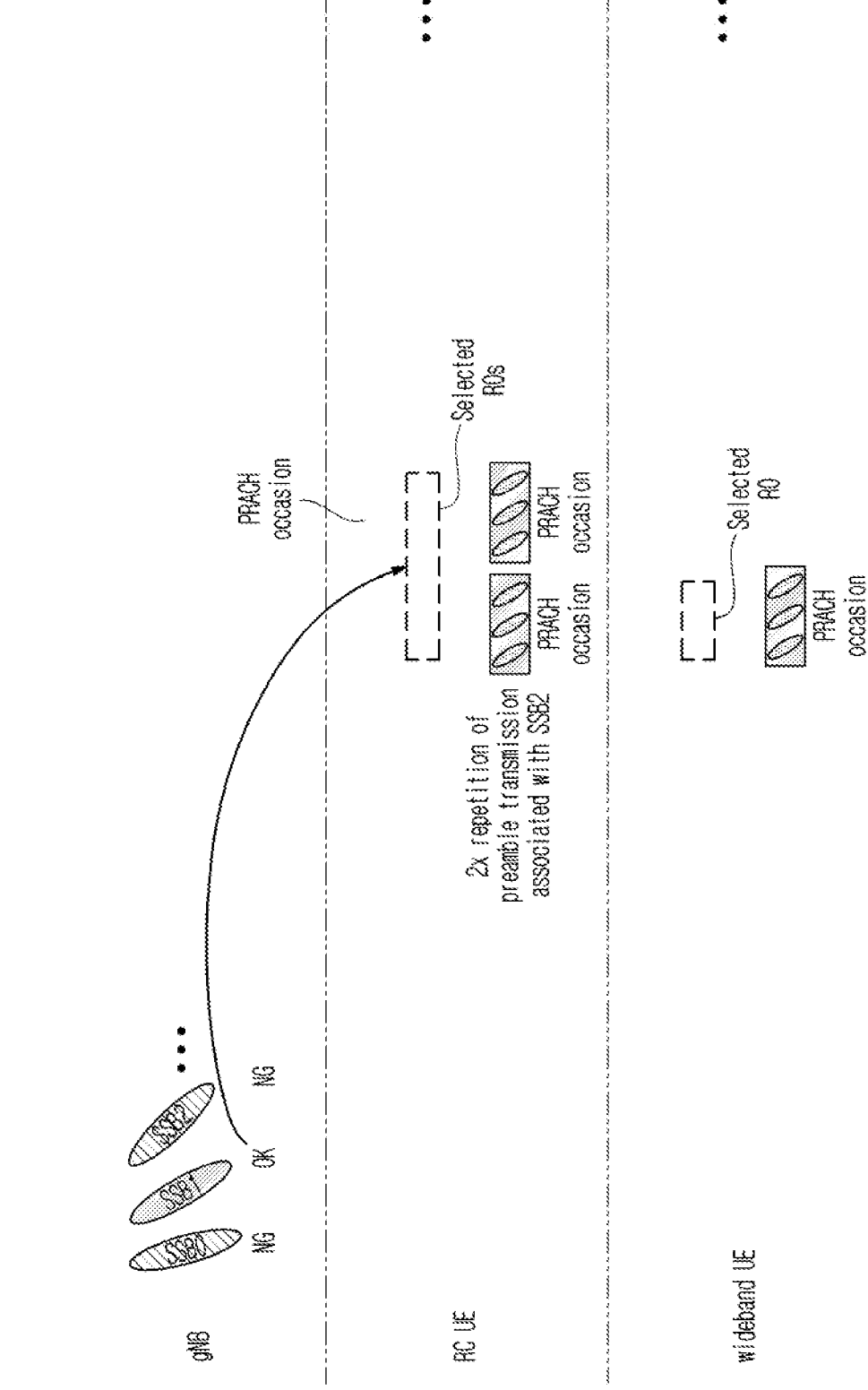
FIG. 8 is a diagram illustrating an example of an RO configuration to which the disclosure is applicable.

FIG. 8 is a diagram illustrating an example of an RO configuration to which the disclosure is applied.

An RO configuration parameter (a first RO configuration parameter) may indicate the number of ROs associated with a single SSB. The first RO configuration parameter may be provided from a base station to a UE via system information (e.g., SIB1). For example, the first RO configuration parameter may be a ssb-perRACH-OccasionAndCB-PreamblesPerSSB parameter in Table 5, by which the number of SSBs per RO and the number of contention-based random access (CBRA) preambles per SSB may be indicated.

In addition, a new RO configuration parameter (a second RO configuration parameter) for an RC UE may be defined. The second RO configuration parameter for such RC UE may be provided from a base station to a UE via system information (e.g., SIB1). For example, the second RO configuration parameter may be referred to as ssb-perRACH-OccasionAndCB-PreamblesPerS SB-RCNR.

Unlike a normal UE, for an RC UE, repetitive transmission of a random access preamble may need to be supported for additional compensation for a coverage loss. In addition, repetitive preamble transmission may need to be performed for each associated SSB.

Accordingly, the RC UE may consider a predetermined RO indicated by the second RO configuration parameter (e.g., ssb-perRACH-OccasionAndCB-PreamblesPerSSB- RCNR) as an RO for preamble transmission by the RC UE, within the number of ROs associated with an SSB indicated by the first RO configuration parameter (e.g., ssb-perRACH-OccasionAndCB-PreamblesPerSSB). That is, the RC UE may select one or more ROs corresponding some of a set of one or more ROs shared with a normal UE.

Referring to FIG. 8, a UE may select a single SSB having the best SSB-RSRP measurement value among a plurality of SSBs (e.g., SSB1, SSB2, SSB3, . . . ) in order to select a subsequent associated RO. The UE may select one or more ROs to be used for repetitive transmission of a random access preamble from among ROs associated with the selected single SSB. A scheme of selecting the one or more ROs associated with the repetitive transmission of the single preamble may be based on an RO configured according to a predetermined rule as described above (e.g., consecutive ROs or a predetermined RO pattern in the time/frequency domain) or via signaling by a base station.

Here, the RO may be defined by a time domain resource (e.g., a PRACH slot) and a frequency domain resource (e.g., a sub-carrier, an RE, an RB, or a BWP). In addition, a plurality of ROs may be distinguished based on time division multiplexing (TDM) and/or frequency division multiplexing (FDM). That is, a plurality of ROs in the same frequency domain resource may be distinguished based on different time domain resources, or a plurality of ROs in the same time domain resource may be distinguished based on different frequency domain resources.

In the example of FIG. 8, prach_FDM denotes the number of frequency domain resources used for distinguishing ROs in the same time domain resource. For example, prach_FDM=4 indicates that 4 different ROs are configured in the same time domain resource (or PRACH slot).

In addition, ssbper RO may denote an association relationship between an SSB and an RO. Here, the value of ssbper RO may be expressed in the form of x/y. If x is 1 and y is 1, 2, 4, 8, . . . , it means that one RO, two ROs, four ROs, eight ROs, . . . are associated with a single SSB. If y is 1 and x is 1, 2, 4, 8, . . . , it means that one SSB, two SSBs, four SSBs, eight SSBs, . . . are associated with a single RO. That is, in the case of an integer of which the value of x/y is greater than 1, the number of preambles (a maximum of 64 preambles) available in a single RO may be distributed to and associated with one or more SSBs. In the example of FIG. 8, ssbper RO=1/8 means that eight different ROs are configured for a single SSB.

The location of an RO(s) configured as described above in the time-frequency domain may be provided to the UE via system information (e.g., PRACH configuration information in SIB1). Therefore, the UE may identify all the locations of ROs in the time-frequency domain, the ROs being associated with an SSB that the UE selects. For example, eight ROs associated with SSB#2 may include four ROs corresponding to first to fourth frequency resources in a first time resource and may include additional four ROs corresponding to first to fourth frequency resources in a second time resource.

In the example of FIG. 8, it is assumed that the UE selects SSB#2. In addition, each SSB is mapped to two time domain RO resources (or PRACH slots) and the value of prach_FDM is 4, and thus four different RO resources may be configured in the single time domain RO resource. Accordingly, eight different RO resources may be configured for a single SSB. Such RO configuration information may be identified by the UE via the system information from the base station.

A normal UE (or wideband UE) may randomly select one of the ROs associated with SSB#2, and may attempt preamble transmission. FIG. 8 illustrates that the normal UE selects an RO in the first time resource and the third frequency resource from among eight ROs associated with SSB#2.

An RC UE may select one or more ROs based on a repetition level, in order to support repetitive preamble transmission. For example, among the ROs associated with SSB#2, a single RO may be selected when the repetition level is 1, and two ROs may be selected when the repetition level is 2. In the example of FIG. 8, the RC UE may determine a repetition level via system information or another system parameter, and may select a corresponding RO(s) based on the determined repetition level (or the number of times of repetitive transmission).

Here, when the RC UE selects one or more ROs for repetitive transmission, the RC UE may randomly select one or more ROs from available ROs. Alternatively, the RC UE may select one or more ROs from available ROs based on a predetermined pattern. Alternatively, the RC UE may select one or more ROs from available ROs in order of lowest (or highest) time domain resource index and/or frequency domain resource index. Here, such available ROs may correspond to some of the set of one or more ROs that the RC UE shares with the normal UE and are indicated by the system information as described above.

In FIG. 8, the repetition level for the RC UE may be set to 2. In this case, from among eight ROs associated with SSB#2,the RC UE may select a single RO in the first time resource and the first frequency resource, and may select another RO in the second time resource and the first frequency resource. The RC UE may repeatedly transmit the same preamble in the selected two ROs.

Although FIG. 8 illustrates that an RC UE selects an RO, this is merely an example and the scope of the disclosure is not limited thereto. For example, repetitive transmission of a random access preamble may include transmission of a preamble in a plurality ROs distinguished in the time domain. In addition, repetitive transmission of a random access preamble may include transmission of a preamble in a plurality ROs distinguished in the frequency domain. The repetitive transmission of a random access preamble may include transmission of a preamble in a plurality different ROs distinguished in the time and/or frequency domain.

Example 2

In the case that a first RO and a second RO are configured separately, Example 2 includes a scheme of reporting, to a base station, whether a UE that performs random access is an RC UE.

The above-described Example 1 relates to the case of applying a common or partially overlapping random access-related configuration to a normal UE and an RC UE. In the example, in the case that a first RO for a normal UE and a second RO for an RC UE are configured differently (i.e., separately) based on an independent random access-related configurations for each of the normal UE and the RC UE, a random access preamble transmission scheme will be described.

Figure 9:
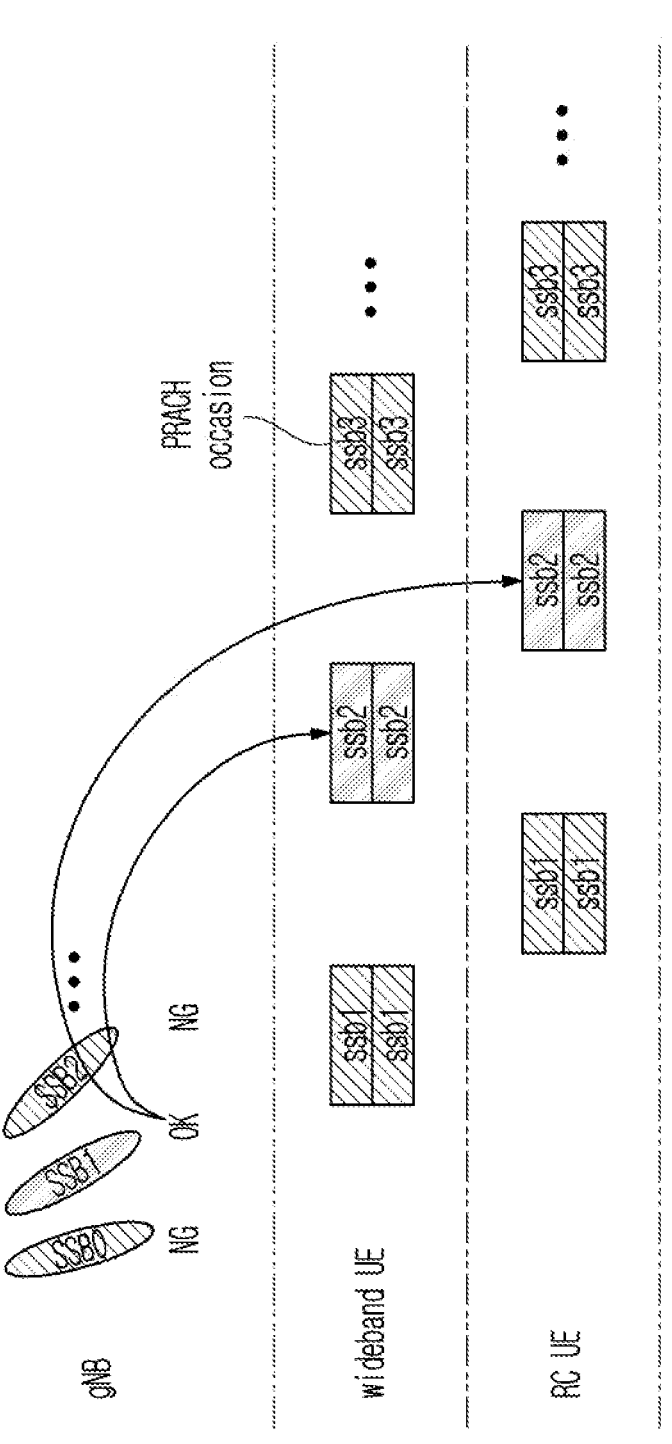
FIG. 9 is a diagram illustrating an example of an RO configuration to which the disclosure is applicable.

FIG. 9 is a diagram illustrating an example of an RO configuration to which the disclosure is applied.

FIG. 9 illustrates the case in which a first RO for a normal UE and a second RO for an RC UE are configured separately. In this case, an RO may be configured independently for the RC UE. Accordingly, excluding the fact that an independent RO is configured for the RC UE, the RC UE may perform preamble transmission (specifically, repetitive preamble transmission) in the RO as described in Example 1.

Here, the independent RO configuration for the RC UE may include an operation of allocating or configuring some RO(s) for the RC UE among all ROs configured for the normal UE and the RC UE in common (or without distinguishing the normal UE and the RC UE), and allocating or configuring the remaining RO(s) for the normal UE, via system information. Alternatively, a configuration for the first RO for the normal UE and a configuration for the second RO for the RC UE may be configured individually via separate system information parameters. Additionally, among all ROs configured for the normal UE and the RC UE in common (or without distinguishing the normal UE and the RC UE), an available RO for each of the normal UE and the RC UE may be indicated or configured via RO mask signaling (e.g., rc-ssb-sharedROmaskindex).

In the example of FIG. 9, two first ROs associated with SSB#2may be configured for the normal UE (or wideband UE), and separately, two second ROs associated with SSB#2may be configured for the RC UE. The two first ROs and the two second ROs may be distinguished in time resources and/or frequency resources.

The above-described RO configurations are merely examples, and the scope of the disclosure is not limited to a predetermined RO configuration scheme, and may include any scheme capable of configuring ROs for the normal UE and the RC UEs. That is, on the assumption that ROs are configured separately for the normal UE and the RC UE according to various RO configuration schemes included or not included in the disclosure, a preamble transmission scheme described below may be applied.

In addition, Example 1 configures some or all of ROs are configured for the normal UE and the RC UE in common, and thus a new preamble group (e.g., a second (third, fourth, . . . ) preamble group or group C (D, E, . . . )) may need to be defined in order to distinguish the normal UE and the RC UE. Unlike the Example 1, the present example configures the first RO for the normal UE and the second RO for the RC UE separately, and thus a new preamble group for distinguishing the normal UE and the RC UE may not be defined.

The present example describes a scheme of selecting a preamble index group and/or an RO based on a repetition level (or the number of times of repetitive transmission/ repetition level or a coverage level), without defining a new preamble group.

In the case that ROs are separately configured for the normal UE and the RC UE, different preamble formats may be configured respectively for the normal UE and the RC UE. For example, the RC UE may support not all preamble formats configured for the normal UE, but may support some of the preamble formats. For example, in the case that a first preamble type (e.g., a short preamble type) and a second preamble type (e.g., a long preamble type) are supported for the normal UE, the RC UE may support only a predetermined preamble format (e.g., the second preamble type) among the first and second preamble types. Alternatively, in the case that preamble format indices (e.g., preamble format #0, #1, #2, #3, A1, A2, A3, B1, B2, B3, B4, CO, C2, and the like) are supported for the normal UE, the RC UE may only support predetermined preamble format indices (e.g., preamble formats #0, #1, #2, and #3). Such restriction of a preamble type or format for the RC UE is merely an example, and a preamble type and/or format usable by the RC UE may be configured according to a predefined scheme or settings by a base station.

Subsequently, in order to configure ROs separately for the normal UE and the RC UE, a random access-related configuration table may be used. The random access-related configuration table may be a previously defined set of configuration parameters (e.g., a preamble format, a cycle, a subframe number, a start symbol, the number of PRACH slots, the number of ROs in the time domain in a PRACH slot, a PRACH duration, and the like) corresponding to each random access-related configuration index (e.g., PRACH configuration index).

In the case that all ROs applied to the normal UE and the RC UE in common (or without distinguishing the normal UE and the RC UE) are configured, each type of UE may share all the configured ROs. In addition, some RO(s) of all the ROs may be configured for the RC UE (or configured exclusively for the normal UE). In this case, the normal UE and the RC UE may use the same random access-related configuration table. For example, the same prach-ConfigurationIndex value may indicate the same random access parameter set for the normal UE and the RC UE.

In the case that a configuration for the first RO for the normal UE and a configuration for the second RO for the RC UE are individually configured via separate system information parameters, each type of UE may use an independent random access-related configuration table. For example, the same prach-ConfigurationIndex value may indicate different random access parameter sets for the normal UE and the RC UE. Although the first RO and the second RO are separately configured, in the case that a separate random access-related configuration table for the RC UE is not defined, the RC UE may also use a random access-related configuration table for the normal UE. For example, the same prach-Configuration-Index value may indicate the same random access parameter set for the normal UE and the RC UE.

In addition, in the case that separate ROs are configured for the normal UE and the RC UE, the first RO for the normal UE and the second RO for the RC UE may be distinguished in time resources and/or frequency resources. Here, FDM related configurations for the first RO and the second RO may be provided by a base station. That is, even in the same time resource, the first RO and the second RO may be distinguished in the frequency resources (i.e., FDM). For FDM configurations for the first and second ROs, for example, the base station may configure msg1-FDM and msg1-FrequencyStart parameters of Table 5 independently for the normal UE and the RC UE. In the case that an independent FDM related parameter for the RC UE is not provided, the RC UE may use an FDM related parameter for the normal UE.

In addition, the first RO for the normal UE and the second RO for the RC UE may be distinguished in the time and/or frequency domain. Here, the first and second RO may be selected respectively from available ROs (or RO candidates or an RO pool). That is, in the example, although an RO that the normal UE selects and an RO that the RC UE selects are distinguished, the range in which the normal UE is capable of selecting an RO and the range in which the RC UE is capable of selecting an RO may overlap partially or entirely.

In this case, in the case that respective RO candidates for the normal UE and the RC UE overlap in time resources and frequency resources, it is assumed that the corresponding RO candidate is invalid for the normal UE and the RC UE (i.e., the corresponding RO candidate may not be selected as any of the first RO or the second RO). Alternatively, it is assumed that the corresponding RO candidate is invalid for the RC UE, but is valid for the normal UE (i.e., the corresponding RO candidate may be selected as the first RO but not as the second RO). Alternatively, it is assumed that the corresponding RO candidate is invalid for the normal UE, but is valid for the RC UE (i.e., the corresponding RO candidate may be selected as the second RO but not as the first RO). Alternatively, whether to select the corresponding RO candidate may be determined according to settings by the UE.

In addition, in the case that separate ROs are configured for the normal UE and the RC UE, an SCS value may be configured independently for preamble transmission of the normal UE and the RC UE. For example, a first SCS value may be set or defined in advance for preamble transmission of the normal UE, and a second SCS value may be set or defined in advance for preamble transmission of the RC UE. For example, in the case of the RC UE, a large number of ROs may need to be secured within the same period time for repetitive preamble transmission. To this end, a higher SCS value may be set for the RC UE than that of the normal UE.

In addition, in the case that separate ROs are configured for the normal UE and the RC UE, the number of SSBs per RO and the number of CBRA preambles per SSB may be configured independently for the normal UE and the RC UE. For example, the ssb-perRACH-OccasionAndCBPre-amblesPerSSB parameter of Table 5 may be applied to the normal UE, and the ssb-perRACH-OccasionAndCB-Pre-amblesPerSSB-RCNR parameter of Table 5 may be applied to the RC UE.

In the examples described hereinafter, in the case that separate ROs are configured for the normal UE and the RC UE are configured, a preamble for a single type of UE may be configured for a single RO. That is, only a preamble for the normal UE is configured for the first RO, and a preamble for the RC UE may be configured for the second RO.

In addition, in the case that one or more repetition levels are applied to the second RO for the RC UE, a preamble group (e.g., group A and/or B) for the normal UE may not be used for the second RO. For example, in the second RO for the RC UE, a first preamble group for the normal UE is not defined, and only a second (third, fourth, . . . ) preamble group (or group C (D, E, . . . )) for the RC UE may be defined. That is, in the case that the repetition level is set to 1, only the second preamble group (or group C) may be defined in the second RO. In the case that the repetition level is set to 2 or a higher value, the second, the third, . . . (or group C, D, . . . ) may be configured in the second RO. However, such preamble group index does not limit the scope of the disclosure, and a plurality of preamble groups in the second RO (independently from a preamble group in the first RO for the normal UE) may be referred to first, second, third . . . preamble groups (or group A, B, C, . . . ).

Example 2-1

Figure 10:
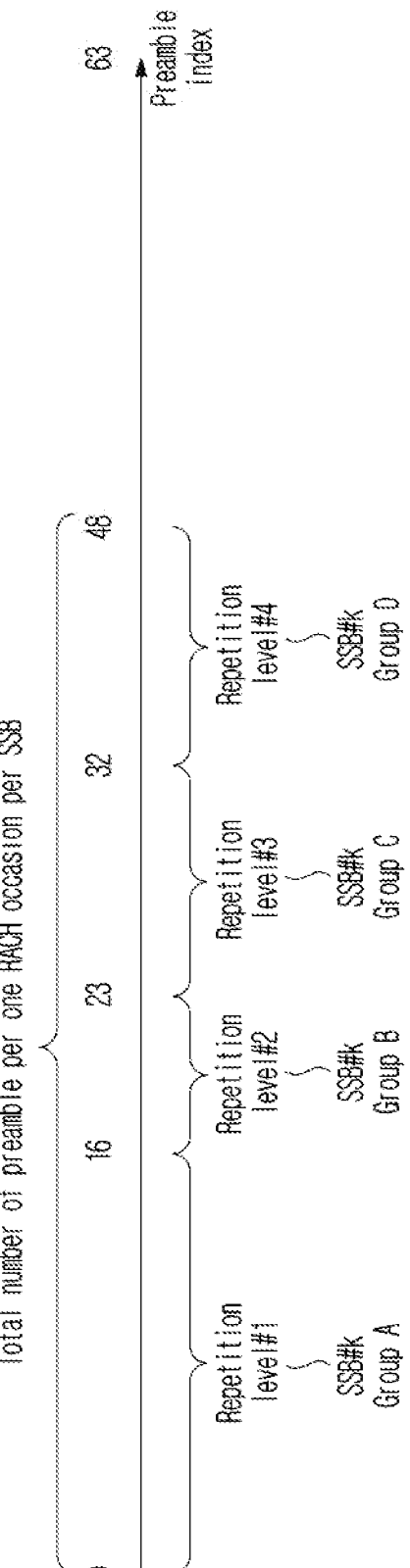
FIG. 10 is a diagram illustrating an example of a preamble group configuration to which the disclosure is applicable.

FIG. 10 is a diagram illustrating an example of a preamble group configuration to which the disclosure is applicable.

FIG. 10 illustrates a preamble configuration in a single RO (e.g., a second RO) corresponding to a single SSB for an RC UE. For example, a total of 48 preambles corresponding to preamble indices in the range of 0 to 47 may be configured in a single RO. Among them, a four different preamble groups may be configured based on four repetition levels (or coverage levels) associated with a single SSB configured by a system. The number of preambles belonging to each preamble group may be the same, or different from each other. In addition, a preamble index set actually usable for each preamble group may be configured.

For example, a first preamble group (or group A) in a single RO associated with SSB#k corresponds to repetition level #1, and group A may include 16 preamble indices in the range of preamble index 0 to 15. Here, the number of actually usable preamble indices among the total of 16 preamble indices may be set to have a value less than 16. Similarly, with respect to second, third, and fourth preamble groups (or group B, C, and D), the number of preamble indices or the set of preamble indices actually usable within the range of the whole preamble indices may be set for each group.

Therefore, for each RO associated with every SSB, the number of preamble groups associated with a single RO, and the number of preamble indices set for each preamble group may be set, and the number of preamble indices or the set of preamble indices configured actually usable among the total number of preamble indices set for each preamble group may be selectively set.

In the example of FIG. 10, it is assumed that a UE selects SSB#k based on an optimal SSB-RSRP. For each of one or more ROs associated with SSB#k, four preamble groups corresponding to four repetition levels (or coverage levels) may be configured. The UE may determine a repetition level based on its capability, and may select a single preamble from a single preamble group corresponding to the determined repetition level (or in the range of preamble indices usable in the single preamble group). The selected preamble may be repeatedly transmitted based on the repetition level.

For example, in the case that the UE determines repetition level #2, the UE may select a second preamble group (or group B), and may select a single preamble index from all preamble indices in the range of 16 to 22 in group B (or from the set of preamble indices or preamble indices corresponding to the number of preamble indices configured to be usable in the range of preamble indices 16 to 22). The UE may transmit a preamble corresponding to the selected preamble index repeatedly two times. Accordingly, upon reception of a preamble belonging to the second preamble group (or group B) in the corresponding RO, the base station may recognize the repetition level (or coverage level) of the corresponding UE.

Example 2-2

Figure 11:
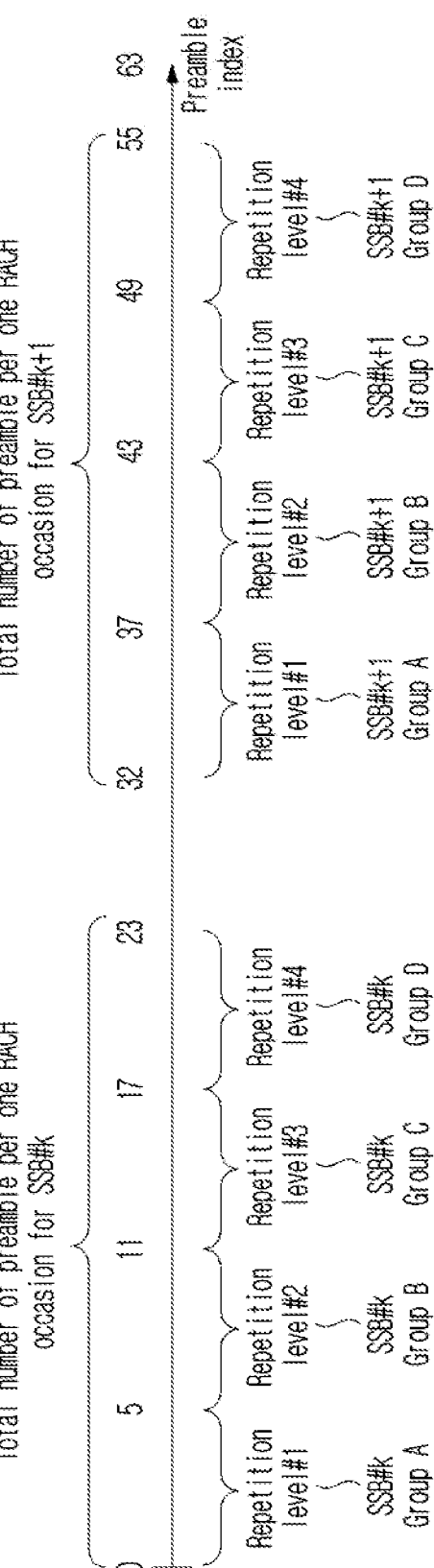
FIG. 11 is a diagram illustrating an example of a preamble group configuration to which the disclosure is applicable.

FIG. 11 is a diagram illustrating an example of a preamble group configuration to which the disclosure is applicable.

A single RO is associated with one or more SSBs, and preamble groups corresponding to one or more repetition levels may be configured in an RO corresponding to a single SSB.

The example of FIG. 11 illustrates the case in which two SSBs (i.e., SSB#k and SSB#k+1) are associated with a single RO. In this case, the set of all preamble indices corresponding to the single RO may be divided as parts corresponding to respective SSBs. Among all the preamble indices in the range of 0 to 63 which correspond to the single RO, preamble indices in the range of 0 to 23 correspond to SSB#k and preamble indices in the range of 32 to 55 correspond to SSB#k+1.

In addition, within a preamble index part corresponding to each SSB, one or more preamble groups may be configured depending on a repetition level. For example, in the preamble index part (0 to 23) corresponding to SSB#k, preamble groups A, B, C, and D respectively corresponding to repetition levels #1, #2, #3, and #4 may be configured. In addition, for example, in the preamble index part (32 to 55) corresponding to SSB#k+1, preamble groups A, B, C, and D respectively corresponding to repetition levels #1, #2, #3, and #4 may be configured. That is, within a single RO, preamble groups may be configured, the number of which corresponds to the product of the number of SSBs associated with the corresponding RO and the (maximum) repetition level.

Alternatively, within a single RO, a preamble part corresponding to each SSB may be configured as a preamble group, and the set of preamble indices corresponding to a repetition level may be configured as a sub-group in the corresponding preamble group.

Information associated with a start index, an end index, and/or the number of preamble indices with respect to each preamble group (or sub-group) in a single RO may be provided from a base station to a UE in advance via system information.

Accordingly, the UE may select an SSB and a preamble group (or sub-group) based on a repetition level in the single RO, may select a single preamble from the preamble group, and may (repeatedly) transmit the same to the base station. Accordingly, the base station identifies a preamble group which a received preamble belongs to in the corresponding RO, and thus may recognize an SSB associated with the corresponding RO and a repetition level (or coverage level) of the corresponding UE.

Example 2-3

Figure 12:
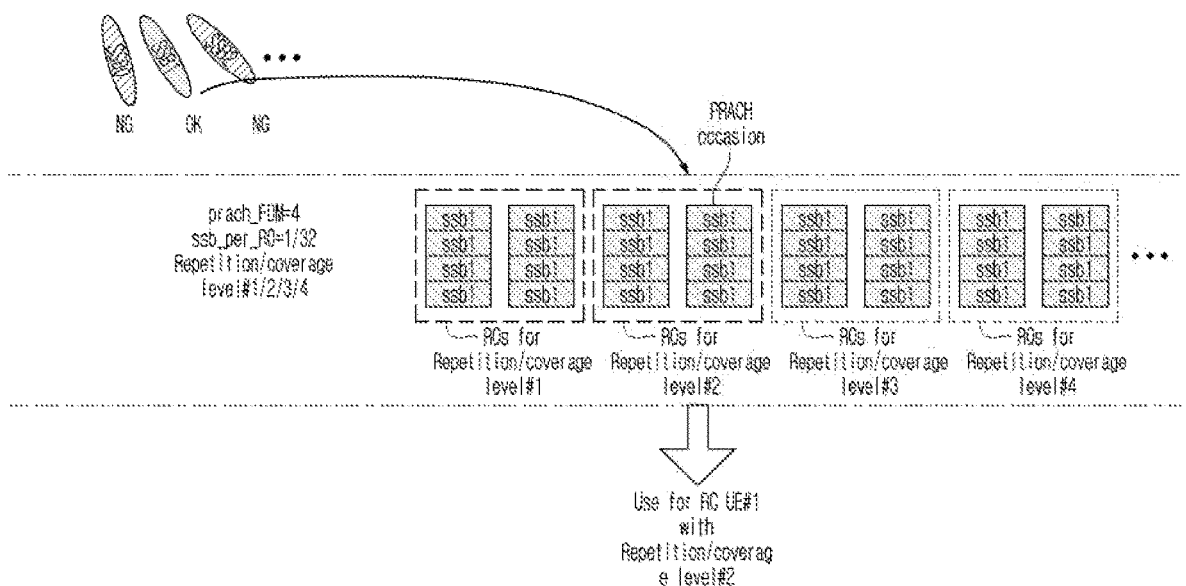
FIG. 12 is a diagram illustrating an example of a preamble group configuration to which the disclosure is applicable.

FIG. 12 is a diagram illustrating an example of a preamble group configuration to which the disclosure is applicable.

If a plurality of ROs associated with a single SSB are present, the plurality of ROs may be grouped based on a repetition level. To this end, independent ROs corresponding to different repetition levels (or coverage levels) may be configured.

The above-described examples correspond to the case in which preamble indices within a single RO are configured as one or more preamble groups depending on a repetition level. In the present example, all preamble indices in a single RO may correspond to the same repetition level, and different repetition levels correspond to different ROs (or different RO groups).

As described above, a preamble repetition level may be set based on an RO unit or an RO group unit. Accordingly, a UE may select an RO corresponding to a repetition level or an RO according to settings by a base station, may select a preamble index from the corresponding RO, and may transmit a preamble to the base station. For example, in an RO group corresponding to a predetermined repetition level, a plurality of ROs may be selected, the number of which corresponds to the predetermined repetition level. The UE may select a preamble index from each of the plurality of ROs, and may transmit a preamble based on the selected preamble index in the plurality of ROs. Here, the UE may select the same preamble index or a different preamble index for each of the plurality of ROs, or the UE may randomly select a preamble index from each RO.

In addition, in a single RO group corresponding to a predetermined repetition level, ROs of which the number corresponds to the repetition level may be distinguished in time resources and/or frequency resources. For example, if the repetition level is 2 or a higher value, the UE may transmit a preamble in a plurality of ROs in frequency resources distinguished in the same time resource, may transmit a preamble in a plurality of ROs in time resources distinguished in the same frequency resource, or may transmit a preamble in a plurality of ROs in distinguished time resources and frequency resources.

In the example of FIG. 12, the UE may determine SSB#1 as an optimal SSB, and may identify a total of 32 ROs corresponding to SSB#1. In addition, the total of 32 ROs corresponding to a single SSB may be configured as four RO groups. A first RO group corresponds to repetition level #1, a second RO group corresponds to repetition level #2, a third RO group corresponds to repetition level #3, and a fourth RO group corresponds to repetition level #4. Among all ROs corresponding to a single SSB, some ROs may be mapped to respective repetition level indices when a repetition level index (beginning with 0) is increased, and the mapping relationship of the example of FIG. 12 may be configured. If the UE determines repetition level #2, the UE may select two ROs (a first RO and a second RO) among eight ROs belonging to the second RO group and may perform repetitive preamble transmission two times. Here, in each RO, the UE may randomly select a preamble index, may select the same preamble index from the first RO and the second RO, or may select different preamble indices from the first RO and the second RO.

As described above, in the case that the UE performs preamble transmission in one or more ROs that belongs to the same RO group corresponding to a predetermined repetition level, the base station may recognize the repetition level of the corresponding UE based on an RO group in which the UE performs preamble transmission.

The repetitive preamble transmission scheme in the above-described examples corresponds to the case of transmitting a preamble of a single preamble index in a single RO. That is, ROs of which the number corresponds to the value of a repetition level may be used for repetitive preamble transmission. For example, in the case that a single preamble group corresponding to repetition level M determined by the UE is selected, a single preamble index may be selected from the selected preamble group, and a single preamble may be transmitted in each of M ROs. In addition, in the case that a single RO group corresponding to repetition level M determined by the UE is selected, a single preamble may be transmitted in each of M ROs in the selected RO group.

As an additional repetitive preamble transmission scheme according to the disclosure, a plurality of preambles may be transmitted in a single RO. For example, a plurality of preambles may be multiplexed in a single RO via distinguished time and/or frequency resources, or a plurality of preambles may be distinguished in the same time-frequency resource in a single RO according to a code division multiplexing (CDM) scheme. Here, a plurality of preambles transmitted in a single RO may have the same preamble index, or may have different preamble indices from each other.

In this case, the repetition level M may correspond to the product of the number of preambles (M_Preamble) transmitted in a single RO and the number of preamble transmission ROs (M_RO) (herein, the number of preambles transmitted in a single RO is different from the number of different preamble indices transmitted in a single RO).

For example, depending on the repetition level M, M_Preamble that is the number of preambles transmitted in a single RO, and M_RO that is the number of preamble transmission ROs may be determined. For example, in the case that repetition level M determined by a UE is 4, that is, M=4, M_Preamble and M_RO may be determined to be M_Preamble=2 and M_RO=2, M_Preamble=1 and M_RO=4, or M_Preamble=4 and M_RO=1.

As described above, one or more times of preamble transmission may be performed in a single RO. In association with the same, the number of preambles allowed in a single RO may be set by a base station. Alternatively, an RO group may be configured based on the number of preambles transmitted in a single RO. For example, in some RO groups among RO groups corresponding to a repetition level of 2 or a higher value, a plurality of (e.g., two) times of preamble transmission may be configured in a single RO.

Here, the above-described repetitive preamble transmission scheme needs to be distinguished from a correspondence relationship between a repetitive transmission level and a preamble group and/or an RO group.

For example, selecting a preamble group and/or an RO group corresponding to the repetition level of a UE may be applied in the same manner as the above-described examples. In this case, the base station recognizes a repetition level determined by the UE not based on the number of times that a preamble is actually repeatedly received, but based on a preamble group or an RO group index selected by the UE.

Particularly, one or a plurality of preamble indices may be selected from a single preamble group corresponding to the repetition level M determined by the UE. Alternatively, a single RO group may be selected from RO groups corresponding to the repetition level M determined by the UE, and one or multiple preamble indices may be selected from the corresponding RO (without distinguishing a preamble group).

For example, the UE may determine repetition level M, and M=4. In this case, the UE may select a single preamble group corresponding to the repetition level M=4, and may select one or multiple preamble indices from the selected preamble group. Accordingly, in each of M_RO ROs among ROs associated with a single SSB (or CSI-RS), the one or more preamble indices selected from the selected preamble group may be repeatedly transmitted as M_Preamble preambles. Alternatively, the UE may select a single RO group corresponding to the repetition level M=4, and may select one or more multiple preamble indices from an RO belonging to the corresponding RO group. Accordingly, in each of M_RO ROs in the selected RO group, the one or more selected preamble indices may be repeatedly transmitted as M_Preamble preambles.

As an additional example, a repetition level determined by the UE may correspond to the combination of an RO group and a preamble group. For example, ROs associated with a single SSB (or CSI-RS) may include a plurality of RO groups, and each RO may include a plurality of preamble groups. In this case, the base station may recognize the repetition level determined by the UE based on a combination of a preamble group and an RO group selected by the UE.

For example, the repetition level determined by the UE may correspond to a combination of a first repetition level corresponding to an RO group and a second repetition level corresponding to a preamble group. For example, in the case that a repetition level determined by the UE is repetition level M=4, the UE may select a single RO group corresponding to a first repetition level=2, and may select a single preamble group corresponding to a second repetition level=2 in an RO belonging to the corresponding RO group. Alternatively, the UE may select a single RO group corresponding to a first repetition level=1, and may select a single preamble group corresponding to a second repetition level=4 from an RO belonging to the corresponding RO group. Alternatively, the UE may select a single RO group corresponding to a first repetition level=4, and may select a single preamble group corresponding to a second repetition level=1 from an RO belonging to the corresponding RO group.

As described above, the UE may select an RO group, and may select one or more preamble indices from a preamble group selected from an RO belonging to the corresponding RO group. Accordingly, in each of M_RO ROs in the selected RO group, one or more preamble indices selected from the selected preamble group may be repeatedly transmitted as M_Preamble preambles.

In addition, the base station may explicitly set or indicate, to a UE, a repetitive preamble transmission level based on the channel state of an RC UE and its type/capability and/or whether the RC UE is in an RRC connected mode. In this case, unlike the above-description, instead of selecting the repetition level by the UE, the base station may indicate the repetition level via DCI signaling and/or higher layer signaling. The UE may receive information associated with the repetition level from the base station, and based thereon, the UE may repeatedly transmit a preamble or message A (e.g., a preamble and a PUSCH in the case of 2-step CBRA and 2-step CFRA). In addition, in the 2-step CBRA or 2-step CFRA that transmits message A, the independent repetitive transmission of each of a preamble and a PUSCH payload included in message A may be configured by the base station or may be selected by the UE. For example, the number of times (P) of repetitive preamble transmission and the number of times (F) of repetitive PUSCH payload transmission corresponding to a repetition level selected by the UE or indicated by the base station according to the above-suggested method may be determined to be different or may be determined to be the same value.

Figure 13:
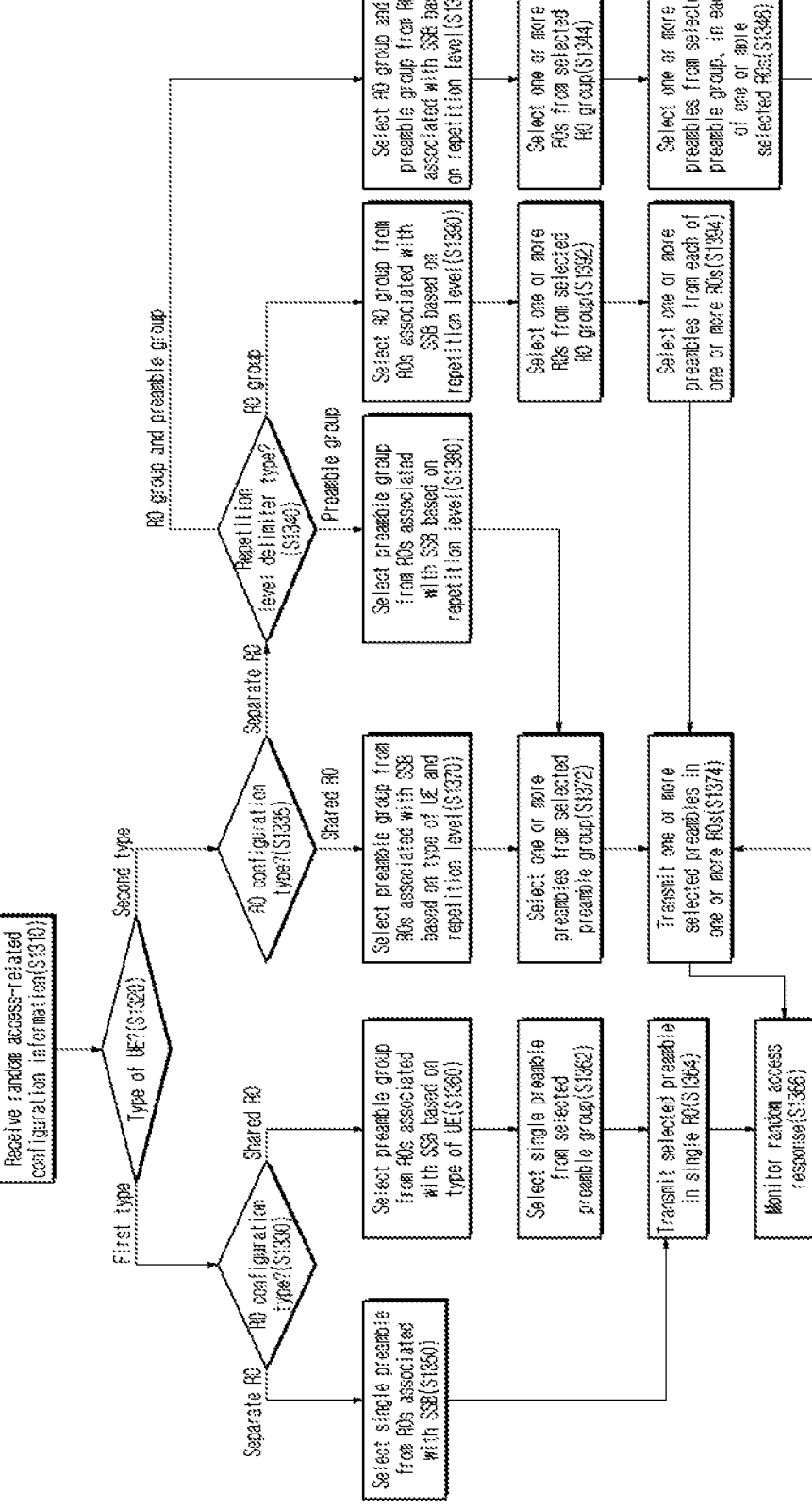
FIG. 13 is a flowchart illustrating the operation of a user equipment (UE) according to the disclosure.

FIG. 13 is a flowchart illustrating the operation of a UE according to the disclosure.

In operation S1310, a UE may receive random access-related configuration information.

For example, the random access-related configuration information may be provided from a base station via system information signaling. The UE may receive system information (e.g., SIB1 or dedicate RRC signaling) including the random access-related configuration information via a cell search operation such as master information block (MIB) reception via a PBCH, downlink synchronization via an SSB, and the like.

In operation S1320, the UE may determine the type of UE. The method may proceed with operation S1330 in the case of a first type of UE (or a normal UE), and may proceed with operation S1335 in the case of a second type of UE (or an RC UE). As described above, a random access preamble transmission operation may be determined based on the type of UE.

In operations S1330 and S1335, the UE may determine an RO configuration type. A shared RO may be configured for the first type of UE and the second type of UE so that they have a shared RO partially or entirely in common, or separate ROs that are different from each other may be configured for the first type of UE and the second type of UE.

In the case that the UE is the first type of UE and a separate RO is configured, the UE may determine an optimal SSB (or CSI-RS) and may select a single RO among available ROs associated with the determined SSB (or CSI-RS) in operation S1350. A single preamble index may be (randomly) selected from all the preamble indices of the selected RO. Here, a single preamble index may be selected from one of preamble group A or preamble group B. Subsequently, the method proceeds with operation 51364, and may transmit a preamble corresponding to the selected preamble index in the single RO.

In the case that the UE is the first type of UE and a shared RO is configured, the UE may determine an optimal SSB (or CSI-RS) and may select a single RO among available ROs associated with the determined SSB (or CSI-RS) in operation 51360. All preamble indices of the selected RO may be configured as different preamble groups depending on the type of UE. The first type of UE may select a first preamble group (or group A and/or B). In operation 51362, the UE may (randomly) select a single preamble index from the selected preamble group. In operation 51364, the UE may transmit a preamble corresponding to the selected preamble index in the single RO.

In the case of the second type of UE, a repetition level may be determined. The repetition level may be determined by the UE or may be explicitly indicated by the base station. In addition, an RO group, a preamble group, or a combination of an RO group and a preamble group corresponding to the repetition level may be configured according to a predetermined rule or via signaling by the base station.

In the case that the UE is the second type of UE and a shared RO is configured, the UE may determine an optimal SSB (or CSI-RS), and may select one or more ROs among available ROs associated with the determined SSB (or CSI-RS) in operation 51370. Here, in the case that a single time of preamble transmission is supported in a single RO, the number of ROs selected may correspond to a repetition level, and in the case that a plurality of times of preamble transmission is supported in a single RO, the product of the number of ROs and the number of preambles transmitted in a single RO may correspond to a repetition level. In addition, in each of the one or more selected ROs, all preamble indices may be configured as different preamble groups depending on the type of UE. In addition, the UE may select, based on the type of UE and a repetition level, a preamble group in each of the one or more ROs. The second type of UE may select a second preamble group (or group C), may select one or more sub-groups in the second preamble group based on a repetition level, or may select a single preamble group among second, third, . . . preamble groups (or group C, D, . . . ) based on a repetition level.

In operation S1372, the UE may (randomly) select one or more preamble indices from the selected preamble group. In the case that the repetition level is 2 or a higher value, two or more ROs may be selected, a single preamble group may be selected from each of the two or more ROs based on the type of UE and the repetition level, and one or more preamble indices may be selected from the selected preamble group. Alternatively, in the case that the repetition level is 2 or a higher value, the number of preamble transmission ROs and the number of preambles transmitted in a single RO may be determined, and based thereon, one or more ROs, a single preamble group, and/or one or more preamble indices may be selected.

In operation S1374, the UE may transmit one or more preambles corresponding to the selected one or more preamble indices in one or more ROs.

In the case that the UE is the second type of UE and a separate RO is configured, a repetition level delimiter type may be determined in operation S1340. Based on the repetition level delimiter type, a preamble group corresponding to a repetition level may be configured or an RO group corresponding to a repetition level may be configured.

In the case that the UE is the second type of UE, a separate RO is configured, and the repetition level delimiter type is set to a preamble group, the UE may determine an optimal SSB (or CSI-RS), and may select one or more ROs among available ROs associated with the determined SSB (or CSI-RS) in operation 51380. Here, in the case that a single time of preamble transmission is supported in a single RO, the number of ROs selected may correspond to a repetition level, and in the case that a plurality of times of preamble transmission is supported in a single RO, the product of the number of ROs and the number of preambles transmitted in a single RO may correspond to a repetition level. In addition, in each of the one or more selected ROs, all preamble indices may be configured as different preamble groups depending on a repetition level. The UE may select a single preamble group based on the repetition level.

Subsequently, in operation S1372, the UE may select one or more preamble indices from the selected preamble group. In the case that the repetition level is 2 or a higher value, two or more ROs may be selected, a single preamble group may be selected from each of the two or more ROs based on the type of UE and the repetition level, and one or more preamble indices may be selected from the selected preamble group. Alternatively, in the case that the repetition level is 2 or a higher value, the number of preamble transmission ROs and the number of preambles transmitted in a single RO may be determined, and based thereon, one or more ROs, a single preamble group, and/or one or more preamble indices may be selected.

In operation S1374, the UE may transmit one or more preambles corresponding to the selected one or more preamble indices in one or more ROs.

In the case that the UE is the second type of UE, a separate RO is configured, and the repetition level delimiter type is set to an RO group, the UE may determine an optimal SSB (or CSI-RS), and may select, based on a repetition level, a single RO group from available ROs associated with the determined SSB (or CSI-RS) in operation 51390. In operation 51392, the UE may select one or more ROs in the selected RO group. Here, in the case that a single time of preamble transmission is supported in a single RO, the number of ROs selected may correspond to a repetition level, and in the case that a plurality of times of preamble transmission is supported in a single RO, the product of the number of ROs and the number of preambles transmitted in a single RO may correspond to a repetition level.

In operation 51394, the UE may select one or more preambles from each of the one or more selected ROs. In the case that the repetition level is 2 or a higher value, two or more ROs may be selected, and one or more preamble indices may be selected from each of two or more ROs. Alternatively, in the case that the repetition level is 2 or a higher value, the number of preamble transmission ROs and the number of preambles transmitted in a single RO may be determined, and based thereon, one or more ROs and/or one or more preamble indices may be selected.

Subsequently, the method proceeds with operation S1374, and the UE may transmit one or more preambles corresponding to the selected one or more preamble indices in one or more ROs.

In the case that the UE is the second type of UE, a separate RO is configured, and the repetition level delimiter type is set to a combination of an RO group and a preamble group, the UE may determine an optimal SSB (or CSI-RS), and may select, based on a repetition level, a single RO group and a single preamble group from available ROs associated with the determined SSB (or CSI-RS) in operation S1342.

In operation S1344, the UE may select one or more ROs from the selected RO group. Here, in the case that a single time of preamble transmission is supported in a single RO, the number of ROs selected may correspond to a repetition level, and in the case that a plurality of times of preamble transmission is supported in a single RO, the product of the number of ROs and the number of preambles transmitted in a single RO may correspond to a repetition level.

In addition, in each of the one or more selected ROs, all preamble indices may be configured as different preamble groups depending on a repetition level. The UE may select a single preamble group based on the repetition level and the single selected RO group.

In operation S1346, the UE may select one or more preamble indices from the selected preamble group, in each of the one or more selected ROs. In the case that the repetition level is 2 or a higher value, two or more ROs may be selected, a single preamble group may be selected from each of the two or more ROs based on the type of UE and the repetition level, and one or more preamble indices may be selected from the selected preamble group. Alternatively, in the case that the repetition level is 2 or a higher value, the number of preamble transmission ROs and the number of preambles transmitted in a single RO may be determined, and based thereon, one or more ROs, a single preamble group, and/or one or more preamble indices may be selected.

Subsequently, the method proceeds with operation S1374, and the UE may transmit one or more preambles corresponding to the selected one or more preamble indices in one or more ROs.

The UE that transmits a preamble in operation 51364 or S1374 as described above, may monitor a random access response (RAR) transmitted from the base station in operation S1366. After receiving an RAR (or Msg2), the UE may complete a random access procedure by exchanging Msg3 and Msg4 with the base station.

In the same manner as the above-described examples, the UE may select an RO group, a preamble group, and/or a preamble index based on capability (or type) and/or a repetition level. In the case that the base station receives a random access preamble (or Msg1) from the UE, the base station may identify whether the corresponding UE is a normal UE or an RC UE based on an RO group in which a preamble is received, a group which a preamble belongs to, and/or a preamble index, and may identify a repetition level (or coverage level) if the UE is identified as the RC UE. As described above, the base station may recognize the existence of an RC UE that attempts a random access procedure at the initial stage, and may support a random access procedure appropriate for the RC UE. Specifically, in the case that the base station identifies that an RC UE attempts random access, the base station may perform a random access procedure appropriate for the capability of the corresponding RC UE in consideration of a repetition level, a message transmission/reception timing, a message size, and the like, for the following process such as Msg2, Msg3, and Msg4 exchanging and HARQ-ACK/NACK transmission.

In the examples of the disclosure, the operation or configuration of a base station and/or a UE may be applicable to the 2-step contention-based RACH procedure (e.g., a contention-based random access procedure including step A in which a UE transmits information corresponding to Msg1 and Msg3, and step B in which a base station transmits information corresponding to Msg4 (and Msg2)), in addition to the 4-step RACH procedure (e.g., a contention-based random access procedure by exchanging Msg1, Msg2, Msg3, and Msg4, which is similar to the example of FIG. 3).

That is, the examples of the disclosure relate to selection of a random access preamble and Msg1 transmission indicating whether a UE is an RC UE, and thus the examples of the disclosure may be applicable to both the 4-step and 2-step contention-based RACH procedures.

Figure 14:
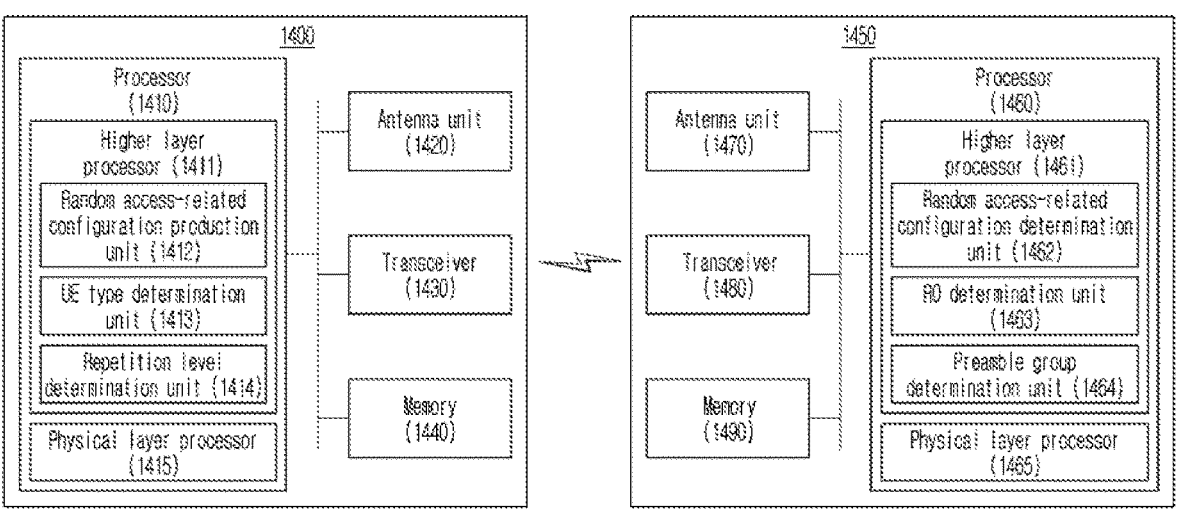
FIG. 14 is a diagram illustrating the configurations of a base station device and a UE device according to the disclosure.

FIG. 14 is a diagram illustrating the configurations of a base station device and a UE device according to the disclosure.

A base station device 1400 may include a processor 1410, an antenna unit 1420, a transceiver 1430, and a memory 1440.

The processor 1410 processes signals related to a baseband, and may include a higher layer processor 1411 and a physical layer processor 1415. The higher layer processor 1411 may process the operations of an MAC layer, an RRC layer, or a higher layer thereof. The physical layer processor 1415 may process the operations of a PHY layer (e.g., uplink reception signal processing, downlink transmission signal processing, or the like). The processor 1410 may control the general operations of the base station device 1400, in addition to processing signals related to a baseband.

The antenna unit 1420 may include one or more physical antennas, and may support MIMO transmission/reception when a plurality of antennas are included. The transceiver 1430 may include an RF transmitter and an RF receiver. The memory 1440 may store information processed by the processor 1410, may store software, an operating system, applications or the like associated with the operation of the base station device 1400, and may include elements, such as a buffer or the like.

The processor 1410 of the base station device 1400 may be configured to implement the operation of a base station described in the examples of the disclosure.

For example, the higher layer processor 1411 of the processor 1410 of the base station device 1400 may include a random access-related configuration information production unit 1412, a UE type determination unit 1413, and a repetition level determination unit 1414.

The random access-related configuration information production unit 1412 may configure an RO group, a preamble group, and/or a preamble index based on the type of UE and/or a repetition level, and may provide the configuration information to the UE device 1450 via system information signaling.

Based on an RO group and/or a preamble group which a random access preamble received from the UE device 1450 belongs to, the UE type determination unit 1413 may identify the UE type of the UE device 1450 (e.g., a normal UE or an RC UE) that transmits a preamble.

In the case that the UE device 1450 that transmits a preamble is identified as a second type of UE (or an RC UE), the repetition level determination unit 1414 may identify the repetition level (or coverage level) of the UE device 1450 that transmits a preamble based on an RO group in which the preamble is received, a preamble group which the preamble belongs to, and the like in association with the random access preamble received from the UE device 1450.

The base station device 1400 may provide an operation appropriate for the corresponding UE in the following random access procedure and the like in consideration of the type of UE and the repetition level of the UE device 1450 that attempts random access.

The UE device 1450 may include a processor 1460, an antenna unit 1470, a transceiver 1480, and a memory 1490.

The processor 1460 processes signals related to a baseband, and may include a higher layer processor 1461 and a physical layer processor 1465. The higher layer processing unit 1461 may process the operations of an MAC layer, an RRC layer, or a higher layer thereof. The physical layer processor 1465 may perform the operation of a PHY layer (e.g., downlink reception signal processing, uplink transmission signal processing, or the like). The processor 1460 may control the overall operation of the UE device 1450, in addition to processing signals related to a baseband.

The antenna unit 1470 may include one or more physical antennas, and may support MIMO transmission/reception when a plurality of antennas are included. The transceiver 1480 may include an RF transmitter and an RF receiver. The memory 1490 may store information processed by the processor 1460, may store software, an operating system, applications or the like associated with the operations of the UE device 1450, and may include elements, such as a buffer or the like.

The processor 1460 of the UE device 1450 may be configured to implement the operation of a UE described in the examples of the disclosure.

For example, the higher layer processor 1461 of the processor 1460 of the UE device 1450 may include a random access-related configuration determination unit 1462, an RO determination unit 1463, and a preamble group determination unit 1464.

The random access-related configuration determination unit 1462 may determine a configuration to be applied to the UE device 1450 based on random access-related configuration information provided from the base station device 1400. For example, the UE device 1450 may identify a configuration associated with an RO group, a preamble group, and/or a preamble index based on the type of UE and/or a repetition level.

The RO determination unit 1463 may determine an RO for random access preamble transmission. For example, among available ROs associated with an optimal SSB (or CSI-RS) determined by the UE device 1450, an RO group or one or more ROs may be determined based on the type of UE and/or a repetition level. First, an RO configuration type may be determined based on the random access-related configuration information. Based on the RO configuration type, an RO may be shared partially or entirely between different types of UEs, or separate ROs may be configured for the different types of UEs. Based on the RO configuration type, the UE device 1450 may select one or more ROs among ROs corresponding to the UE type of the UE device. In addition, in the case that a repetition level delimiter configuration is associated with an RO group, an RO group corresponding to a repetition level may be selected.

The preamble group determination unit 1464 may determine a single preamble group per RO based on the type of UE and/or a repetition level. In the case that the repetition level delimiter configuration is associated with a preamble group, a preamble group corresponding to a repetition level may be selected. In addition, one or more preamble indices may be selected from the selected preamble group.

In the case that the repetition level delimiter configuration is associated with a combination of an RO group and a preamble group, the RO determination unit 1463 and the preamble group determination unit 1464 may select an RO group and a preamble group corresponding to a repetition level.

The physical layer processor 1465 may transmit a random access preamble to the base station device 1400 based on an RO and a preamble index determined by the higher layer processor 1461.

Descriptions associated with a base station and a UE provided with reference to the examples of the disclosure may be equally applied to the operation of the base device 1400 and the UE device 1450, and repetitious descriptions will be omitted.

While the exemplary method of the present disclosure is described as a series of operations, for clarity of description, this does not limit the order of steps. When needed, the steps may be performed at the same time or in a different order. In order to implement the method according to the present disclosure, the exemplary method may further include additional steps, include the remaining steps except for some steps, or may include additional steps other than some steps.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable instructions (e.g., an operating system, applications, firmware, programs, and the like) that enable operations according to the method of various examples to be implemented in an apparatus or a computer, and a non-transitory computer-readable medium that stores such software, instructions, or the like and implements the same in an apparatus or a computer. Instructions that may be used for programing a processing system that performs the characteristics described in the disclosure may be stored in a storage medium or a computer-readable storage medium, and the characteristics described in the disclosure may be embodied using a computer program product that includes such storage medium. Although the storage medium may include high-speed random access memory, such as DRAM, SRAM, DDR RAM, or other random access solid state memory devices, the storage medium is not limited thereto, and may include non-volatile memory such as one or more magnetic-disc storage devices, optical disk storage devices, flash memory devices, or other non-volatile solid state storage devices. Memory may selectively include one or more storage devices located distant from a processor(s). Memory, or alternatively, a non-volatile memory device(s) in memory, may include a non-transitory computer-readable storage medium. The characteristics described in the disclosure may be stored in any one of machine-readable media and may control hardware of a processing system, and may be integrated with software and/or firmware that enables the processing system to mutually interact with other mechanisms that utilize results according to the examples of the disclosure. Such software or firmware may include application code, a device driver, an operating system, and an execution environment/container, but is not limited thereto.

Examples of the disclosure may be applied various wireless communication systems.

What is claimed is:

1. A method performed by a first wireless user device, the method comprising:
  receiving, from a base station:
    at least one random access parameter for a first group of wireless user devices, wherein the first group of wireless user devices provide at least one capability unavailable for a second group of wireless user devices;
    at least one random access parameter for the second group of wireless user devices, wherein the second group of wireless user devices comprises the first wireless user device; and
    system information indicating at least one of:
      at least one parameter associated with a plurality of wireless user devices, wherein the plurality of wireless user devices comprises the first group of wireless user devices and the second group of wireless user devices; or
      at least one reduced capability parameter associated with the second group of wireless user devices;
  selecting, based on the at least one random access parameter for the second group of wireless user devices, a random access resource comprising at least one of:
    a random access preamble resource configured for the second group of wireless user devices; or
    a random access channel (RACH) occasion configured for the second group of wireless user devices; and
  transmitting, to the base station and based on the selected random access resource, a random access preamble,
  wherein the second group of wireless user devices comprises at least one reduced capability user device, and
  wherein the first wireless user device is a reduced capability user device.

2. The method of claim 1, wherein the first wireless user device provides at least one reduced capability comprising at least one of:
  a reduced bandwidth capability;
  a reduced antenna capability;
  a reduced transmission power capability; or
  a reduced half-duplex capability.

3. The method of claim 1, wherein the at least one random access parameter for the second group of wireless user devices indicates at least one of:
  a starting preamble associated with the second group of wireless user devices; or
  a number of preambles associated with the second group of wireless user devices.

4. The method of claim 3, wherein the at least one random access parameter for the second group of wireless user devices comprises:
  a first preamble parameter indicating the starting preamble; and
  a second preamble parameter indicating the number of preambles, and
  wherein the selecting the random access resource comprises:
  selecting, based on the first preamble parameter and the second preamble parameter, a random access preamble as the random access preamble resource configured for the second group of wireless user devices.

5. The method of claim 4, wherein the selected random access preamble comprises at least one of:
  a message A (MsgA) preamble configured for a two-step random access procedure; or
  a message 1 (Msg1) preamble configured for a four-step random access procedure.

6. The method of claim 1, wherein the at least one random access parameter for the second group of wireless user devices indicates a mask index associated with the RACH occasion configured for the second group of wireless user devices.

7. The method of claim 6, wherein the mask index indicates a subset of RACH occasions associated with the second group of wireless user devices, and wherein the subset of RACH occasions is comprised in RACH occasions shared among the first group of wireless user devices and the second group of wireless user devices.

8. The method of claim 1, wherein the at least one random access parameter for the second group of wireless user devices comprises:

a random access configuration associated with a four-step random access; and a random access configuration associated with a two-step random access.

9. The method of claim 1, further comprising:

receiving, from the base station, a random access response; and receiving, from the base station and via a downlink channel configured for a reduced capability user device, at least one of:

downlink control information; or downlink shared channel data.

10. The method of claim 1, wherein the at least one random access parameter for the second group of wireless user devices comprises a parameter for a message 3 (Msg3) for the second group of wireless user devices.

11. The method of claim 1, wherein the at least one reduced capability parameter associated with the second group of wireless user devices comprises a system information block (SIB) parameter indicating an initial uplink bandwidth part dedicated to the second group of wireless user devices, and wherein the transmitting the random access preamble comprises transmitting, via the initial uplink bandwidth part dedicated to the second group of wireless user devices, the random access preamble.

12. A method performed by a base station, the method comprising:

transmitting, to at least one wireless user device comprising a first wireless user device:

at least one random access parameter for a first group of wireless user devices, wherein the first group of wireless user devices provide at least one capability unavailable for a second group of wireless user devices;

at least one random access parameter for the second group of wireless user devices, wherein the second group of wireless user devices comprises the first wireless user device; and system information indicating at least one of:

at least one parameter associated with a plurality of wireless user devices, wherein the plurality of wireless user devices comprises the first group of wireless user devices and the second group of wireless user devices; or at least one reduced capability parameter associated with the second group of wireless user devices;

receiving, from the first wireless user device and based on a random access resource associated with the at least one random access parameter for the second group of wireless user devices, a random access preamble, wherein the random access resource comprises at least one of:

a random access preamble resource configured for the second group of wireless user devices; or a random access channel (RACH) occasion configured for the second group of wireless user devices;

after receiving the random access preamble, determining that the first wireless user device belongs to the second group of wireless user devices, wherein the determining is based on at least one of:

the random access preamble, the random access preamble resource; or the RACH occasion; and transmitting, to the first wireless user device, a random access response associated with the received random access preamble, wherein the second group of wireless user devices comprises at least one reduced capability user device, and wherein the first wireless user device is a reduced capability user device.

13. The method of claim 12, wherein the first wireless user device provides at least one reduced capability comprising at least one of:

a reduced bandwidth capability;

a reduced antenna capability;

a reduced transmission power capability; or a reduced half-duplex capability.

14. The method of claim 12, wherein the at least one random access parameter for the second group of wireless user devices indicates at least one of:

a starting preamble associated with the second group of wireless user devices; or a number of preambles associated with the second group of wireless user devices.

15. The method of claim 14, wherein the at least one random access parameter for the second group of wireless user devices comprises:

a first preamble parameter indicating the starting preamble; and a second preamble parameter indicating the number of preambles, and wherein the random access preamble is one of a plurality of random access preambles associated with:

the first preamble parameter; and the second preamble parameter.

16. The method of claim 15, wherein the received random access preamble comprises at least one of:

a message A (MsgA) preamble configured for a two-step random access procedure; or a message 1 (Msg1) preamble configured for a four-step random access procedure.

17. The method of claim 12, wherein the at least one random access parameter for the second group of wireless user devices indicates a mask index associated with the RACH occasion configured for the second group of wireless user devices.

18. The method of claim 17, wherein the mask index indicates a subset of RACH occasions associated with the second group of wireless user devices, and wherein the subset of RACH occasions is comprised in RACH occasions shared among the first group of wireless user devices and the second group of wireless user devices.

19. The method of claim 12, wherein the at least one random access parameter for the second group of wireless user devices comprises:

a random access configuration associated with a four-step random access; and a random access configuration associated with a two-step random access.

20. The method of claim 12, further comprising:

after transmitting the random access response, transmitting, to the first wireless user device and via a downlink channel configured for a reduced capability user device, at least one of:

downlink control information; or downlink shared channel data.

21. The method of claim 12, wherein the at least one random access parameter for the second group of wireless user devices comprises a parameter for a message 3 (Msg3) for the second group of wireless user devices.

22. The method of claim 12, wherein the at least one reduced capability parameter associated with the second group of wireless user devices comprises a system information block (SIB) parameter indicating an initial uplink bandwidth part dedicated to the second group of wireless user devices, and wherein the receiving the random access preamble comprises receiving, via the initial uplink bandwidth part dedicated to the second group of wireless user devices, the random access preamble.

\*   \*   \*   \*   \*